(12) United States Patent
Oryoji

(10) Patent No.: US 11,165,945 B2
(45) Date of Patent: Nov. 2, 2021

(54) INFORMATION PROCESSING DEVICE, METHOD, AND MULTI-CAMERA SYSTEM

(71) Applicant: SONY CORPORATION, Tokyo (JP)

(72) Inventor: Hiroshi Oryoji, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 643 days.

(21) Appl. No.: 16/077,194

(22) PCT Filed: Nov. 25, 2016

(86) PCT No.: PCT/JP2016/085054
§ 371 (c)(1),
(2) Date: Aug. 10, 2018

(87) PCT Pub. No.: WO2017/149869
PCT Pub. Date: Sep. 8, 2017

(65) Prior Publication Data
US 2021/0183101 A1 Jun. 17, 2021

(30) Foreign Application Priority Data
Feb. 29, 2016 (JP) .............. JP2016-037835

(51) Int. Cl.
*G06T 7/80* (2017.01)
*H04N 5/232* (2006.01)
(Continued)

(52) U.S. Cl.
CPC ......... *H04N 5/232061* (2018.08); *G06T 7/70* (2017.01); *G06T 7/80* (2017.01);
(Continued)

(58) Field of Classification Search
CPC ... G06T 7/80; G06T 7/70; G06T 2207/30204; H04N 1/00047; H04N 1/00087; H04N 1/00005; H04N 5/247; H04N 17/002
(Continued)

(56) References Cited

U.S. PATENT DOCUMENTS 9,001,226 B1 4/2015 Ng et al.
2006/0116837 A1* 6/2006 Hager ................. G01C 25/00
702/95

(Continued)

FOREIGN PATENT DOCUMENTS

CN 101635056 A 1/2010
CN 104160700 A 11/2014
(Continued)

OTHER PUBLICATIONS

Office Action for JP Patent Application No. 2018-502529, dated May 12, 2020, 07 pages of Office Action and 06 pages of English Translation.
(Continued)

*Primary Examiner* — Jerome Grant, II
(74) *Attorney, Agent, or Firm* — Chip Law Group

(57) ABSTRACT

There is provided an information processing device including an information acquisition unit that acquires camera location information indicating locations of a plurality of imaging cameras located in an imaging space, and an evaluation unit that acquires calibration accuracy obtained in a case of locating a calibration camera in the imaging space on a basis of the location of each of the plurality of imaging cameras indicated by the camera location information and a location of the calibration camera.

17 Claims, 16 Drawing Sheets

(51) Int. Cl.
*G06T 7/70* (2017.01)
*H04N 1/00* (2006.01)
*H04N 5/247* (2006.01)
*H04N 17/00* (2006.01)

(52) U.S. Cl.
CPC ..... *H04N 1/00005* (2013.01); *H04N 1/00047* (2013.01); *H04N 1/00087* (2013.01); *H04N 5/247* (2013.01); *H04N 17/002* (2013.01); *G06T 2207/30204* (2013.01)

(58) Field of Classification Search
USPC .......................................................... 382/154
See application file for complete search history.

(56) References Cited

U.S. PATENT DOCUMENTS

| | | | |
|---|---|---|---|
| 2012/0293659 A1 | 11/2012 | Bandou | |
| 2014/0146185 A1* | 5/2014 | Kannermark | H04N 17/002 348/187 |
| 2016/0050367 A1 | 2/2016 | Shimauchi et al. | |
| 2020/0402258 A1* | 12/2020 | Gope | G06T 7/80 |
| 2021/0100156 A1* | 4/2021 | Iwase | G01S 7/5205 |

FOREIGN PATENT DOCUMENTS

| | | |
|---|---|---|
| CN | 105308946 A | 2/2016 |
| CN | 105338233 A | 2/2016 |
| EP | 3008888 A1 | 4/2016 |
| EP | 3425897 A1 | 1/2019 |
| JP | 2004-088247 A | 3/2004 |
| JP | 2011-151666 A | 8/2011 |
| JP | 2012-526995 A | 11/2012 |
| JP | 2013-201677 A | 10/2013 |
| JP | 5341789 B2 | 11/2013 |
| JP | 2014-241496 A | 12/2014 |
| WO | 2010/132791 A1 | 11/2010 |
| WO | 2011/090163 A1 | 7/2011 |
| WO | 2014/199564 A1 | 12/2014 |

OTHER PUBLICATIONS

International Search Report and Written Opinion of PCT Application No. PCT/JP2016/085054, dated Feb. 14, 2017, 07 pages of ISRWO.

Partial Supplementary European Search Report of EP Patent Application No. 16892704.4, dated Jan. 15, 2019, 17 pages Extended European Search Report of EP Application No. 16892704.4, dated Apr. 25, 2019, 16 pages.

Office Action for CN Patent Application No. 201680082324.1, dated Mar. 20, 2020, 08 pages of Office Action and 08 pages of English Translation.

* cited by examiner

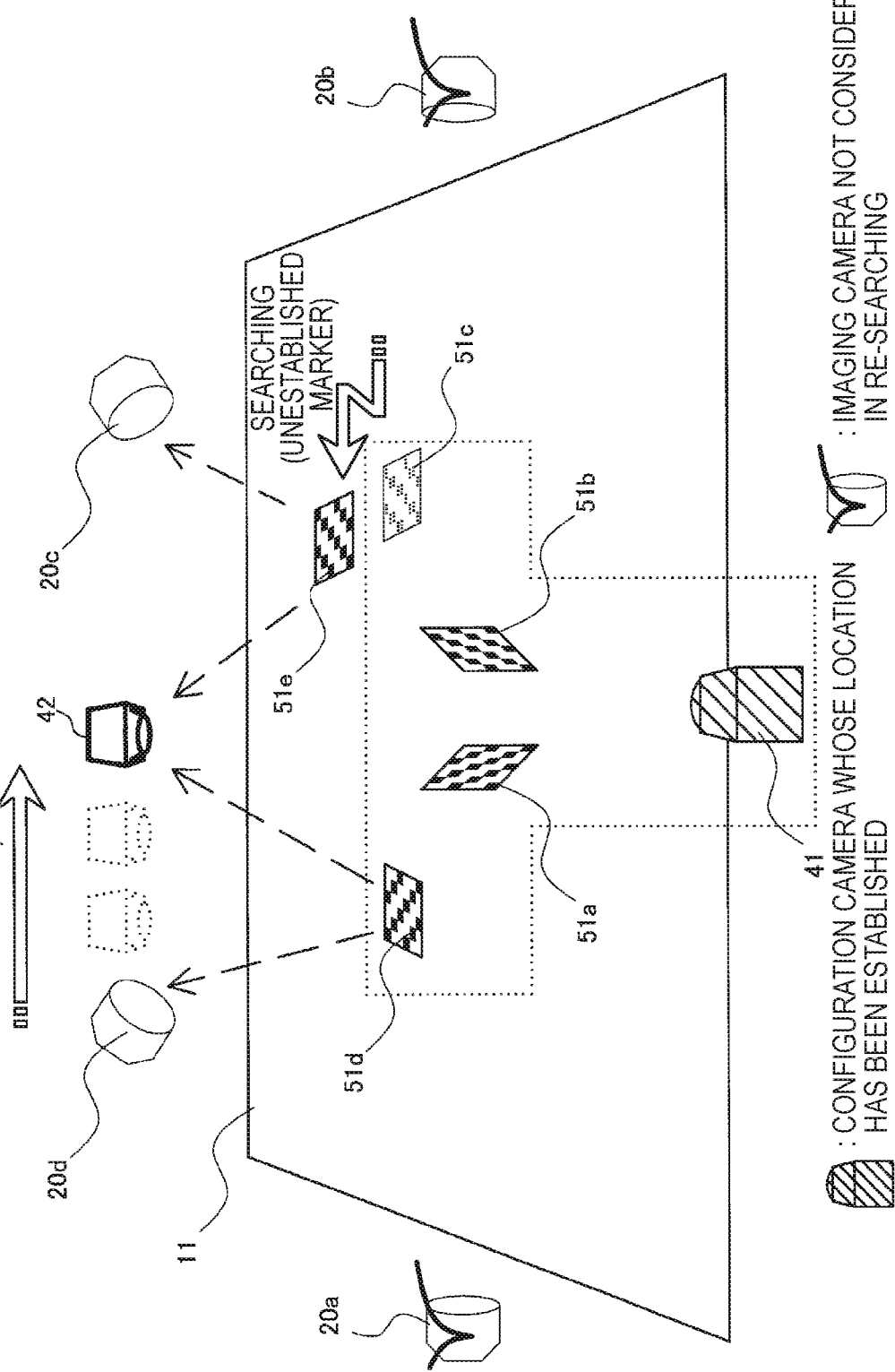

INFORMATION PROCESSING DEVICE, METHOD, AND MULTI-CAMERA SYSTEM

CROSS REFERENCE TO RELATED APPLICATIONS

This application is a U.S. National Phase of International Patent Application No. PCT/JP2016/085054 filed on Nov. 25, 2016, which claims priority benefit of Japanese Patent Application No. JP 2016-037835 filed in the Japan Patent Office on Feb. 29, 2016. Each of the above-referenced applications is hereby incorporated herein by reference in its entirety.

TECHNICAL FIELD

The present disclosure relates to an information processing device, a method, a program, and a multi-camera system.

BACKGROUND ART

Conventionally, a multi-camera system that integrally processes images from respective cameras located at a plurality of sites in real space is known. In recording or reproduction of images, for example, the multi-camera system may stitch images from a plurality of cameras to generate a series of images reproduced successively while seamlessly moving a huge composite image or field of view. The multi-camera system may also be utilized for analyzing or recognizing a three-dimensional motion of a subject. In order to smoothly and integrally process images from a plurality of cameras in the multi-camera system, it is important that calibration of the cameras is performed appropriately, and a relative relationship among parameters such as camera position, attitude, or angle of view is grasped correctly.

Calibration of the cameras for the multi-camera system is generally performed in accordance with a reference camera method or a sequential method. According to the reference camera method, one of a plurality of imaging cameras is selected as a reference camera, and calibration is performed between the reference camera and each of the remaining cameras. According to the sequential method, calibration is performed in such a cascaded manner that calibration is performed between a first camera and a second camera, then calibration is performed between the second camera and a third camera, then calibration is performed between the third camera and a fourth camera . . . . Patent Literature 1 discloses a technique for calibrating, in a multi-camera system, image properties such as brightness and white balance of an image captured by each camera in accordance with the reference camera method.

CITATION LIST

Patent Literature

Patent Literature 1: JP 2004-088247A

DISCLOSURE OF INVENTION

Technical Problem

However, the existing reference camera method has a disadvantage in that the optimum location for calibration is not necessarily achieved for all the pairs of the reference camera and another imaging camera. In many cases, the camera location is determined through trial and error performed by an operator at a location site. However, there is also a trade-off problem in such a manner that, when the camera location is optimized for calibration, for example, the location is not suitable for imaging.

On the other hand, the sequential method has a disadvantage in that errors accumulate as a result of performing calibration in a cascaded manner. If recalculation (so-called bundle adjustment) for ultimately distributing errors among cameras is executed, errors themselves may be reduced, but calculation cost for the recalculation is likely to be enormous.

The technology according to the present disclosure has an object to resolve or reduce at least one of the disadvantages in these existing techniques.

Solution to Problem

According to the present disclosure, there is provided an information processing device including: an information acquisition unit configured to acquire camera location information indicating locations of a plurality of imaging cameras located in an imaging space; and an evaluation unit configured to evaluate calibration accuracy obtained in a case of locating a calibration camera in the imaging space on a basis of the location of each of the plurality of imaging cameras indicated by the camera location information and a location of the calibration camera.

In addition, according to the present disclosure, there is provided a method executed by an information processing device, the method including: acquiring camera location information indicating locations of a plurality of imaging cameras located in an imaging space; and evaluating calibration accuracy obtained in a case of locating a calibration camera in the imaging space on a basis of the location of each of the plurality of imaging cameras indicated by the camera location information and a location of the calibration camera.

In addition, according to the present disclosure, there is provided a program for causing a processor of an information processing device to function as: an information acquisition unit configured to acquire camera location information indicating locations of a plurality of imaging cameras located in an imaging space; and an evaluation unit configured to evaluate calibration accuracy obtained in a case of locating a calibration camera in the imaging space on a basis of the location of each of the plurality of imaging cameras indicated by the camera location information and a location of the calibration camera.

In addition, according to the present disclosure, there is provided a multi-camera system including: a plurality of imaging cameras located in an imaging space and configured to image the imaging space; and a calibration camera located in the imaging space and involved in calibration for locations of the plurality of imaging cameras. A location of the calibration camera is determined so as to optimize accuracy of the calibration assuming that the locations of the plurality of imaging cameras are given.

Advantageous Effects of Invention

The technology according to the present disclosure enables a camera location for optimizing calibration of a multi-camera system to be found efficiently without trial and error.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is an explanatory diagram for describing searching for a location of an additional calibration camera.

MODE(S) FOR CARRYING OUT THE INVENTION

Figure 1:
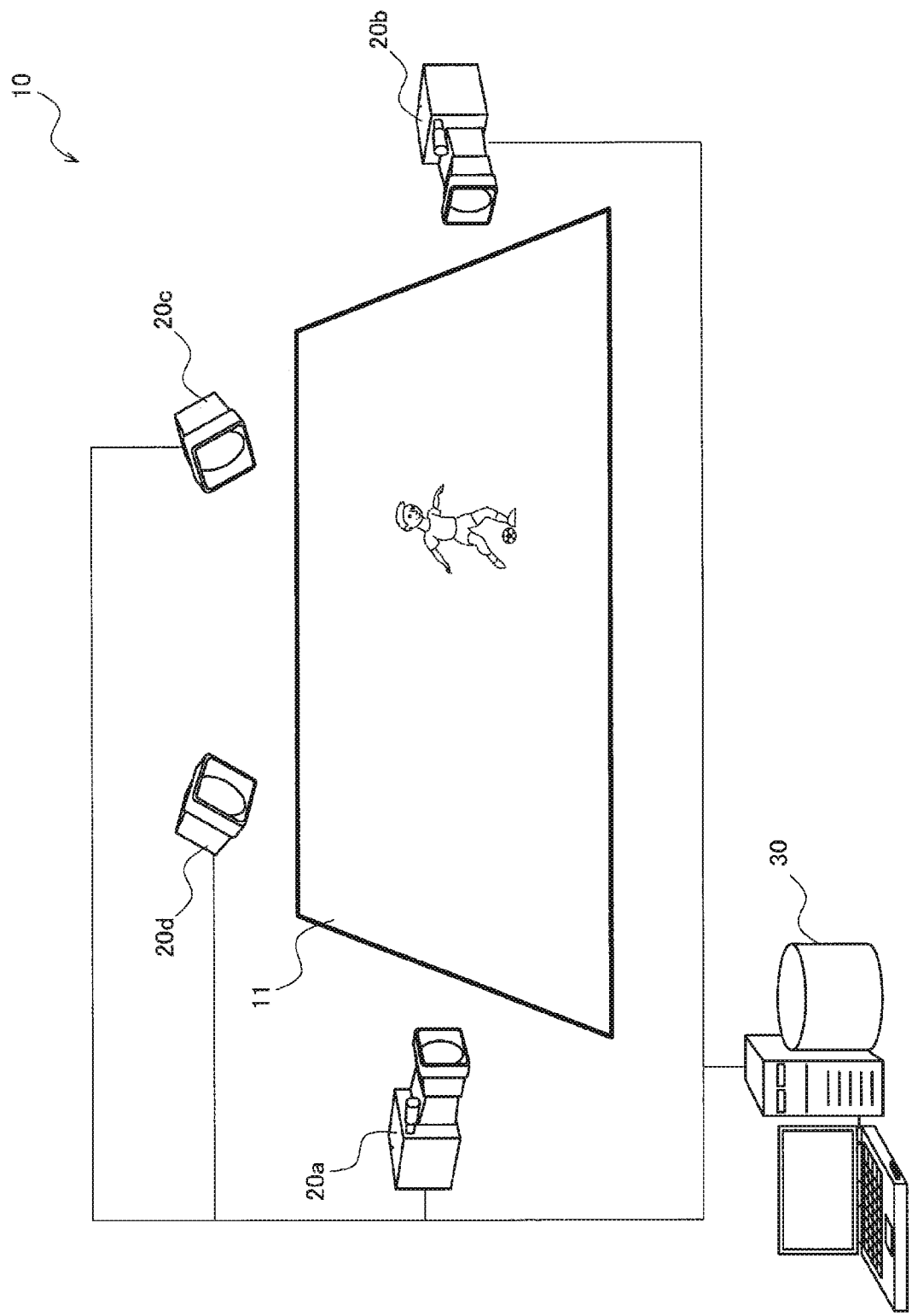
FIG. 1 is an explanatory diagram for describing an example of a general configuration of a multi-camera system.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided in the following order.
1. Introduction
1-1. General configuration of multi-camera system
1-2. Existing technique for calibration
1-3. Employment of calibration camera
1-4. Introduction of calibration accuracy evaluation device
2. Configuration of calibration accuracy evaluation device according to one embodiment
3. Flow of processing according to one embodiment
3-1. Location optimization processing
3-2. Position searching processing
3-3. Attitude searching processing
4. Employment of omnidirectional camera
4-1. Omnidirectional camera as calibration camera
4-2. Omnidirectional camera as imaging camera
5. Application examples
6. Conclusion

1. INTRODUCTION

[1-1. General Configuration of Multi-Camera System]

FIG. 1 is an explanatory diagram for describing an example of a general configuration of a multi-camera system. With reference to FIG. 1, a plurality of cameras $20a$, $20b$, $20c$, and $20d$ are located in an imaging space 10. These cameras $20a$, $20b$, $20c$, and $20d$ image a field 11 from respective viewpoints to generate captured images. A captured image may be a still image, or may be each of frames included in a moving image. The field 11 is a partial space in which a target of imaging is present. In the example of FIG. 1, the field 11 is a site where a sport is played. The captured image generated by the cameras $20a$, $20b$, $20c$, and $20d$ are transmitted to a server 30 via a network. The server 30 integrally processes the captured images received from the cameras $20a$, $20b$, $20c$, and $20d$. For example, in recording or reproduction of images, the server 30 may stitch a plurality of captured images from different viewpoints to generate a huge composite image. In addition, the server 30 may generate a series of images reproduced successively while seamlessly moving the field of view of the display. In addition, the server 30 may recognize a three-dimensional motion of a subject on the basis of analysis of parallax.

The multi-camera system may include any number of cameras. In addition, the cameras may be located in the imaging space at any position and attitude in line with the object of the system. In the present specification, the camera "location" shall usually mean the camera position and attitude in real space. However, in the case where consideration of the attitude may be omitted as in an omnidirectional camera whose angle of view is not restricted, the camera "location" may only mean the camera position in real space.

Figure 2:
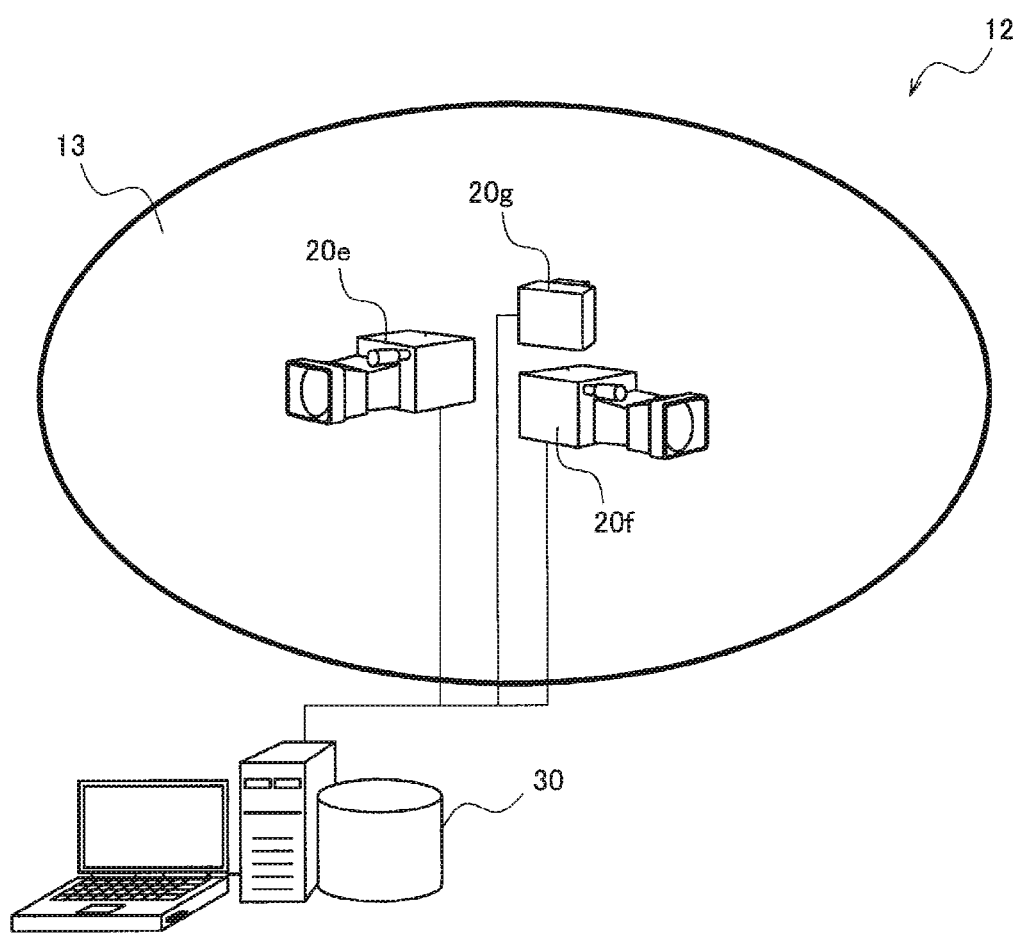
FIG. 2 is an explanatory diagram for describing another example of a general configuration of a multi-camera system.

FIG. 2 is an explanatory diagram for describing another example of a general configuration of a multi-camera system. With reference to FIG. 2, a plurality of cameras $20e$, $20f$, and $20g$ are located in an imaging space 12. These cameras $20e$, $20f$, and $20g$ image a field 13 from respective viewpoints to generate captured images. Also in the example of FIG. 2, the captured images generated by the cameras $20e$, $20f$, and $20g$ are transmitted to the server 30 via a network, and are integrally processed by the server 30.

Note that, in the case where it is not necessary to distinguish the cameras $20a$ to $20g$ from one another in the following description, they will be collectively referred to as a camera 20 by omitting the alphabets at the end of the reference numerals.

[1-2. Existing Technique for Calibration]

Figure 3:
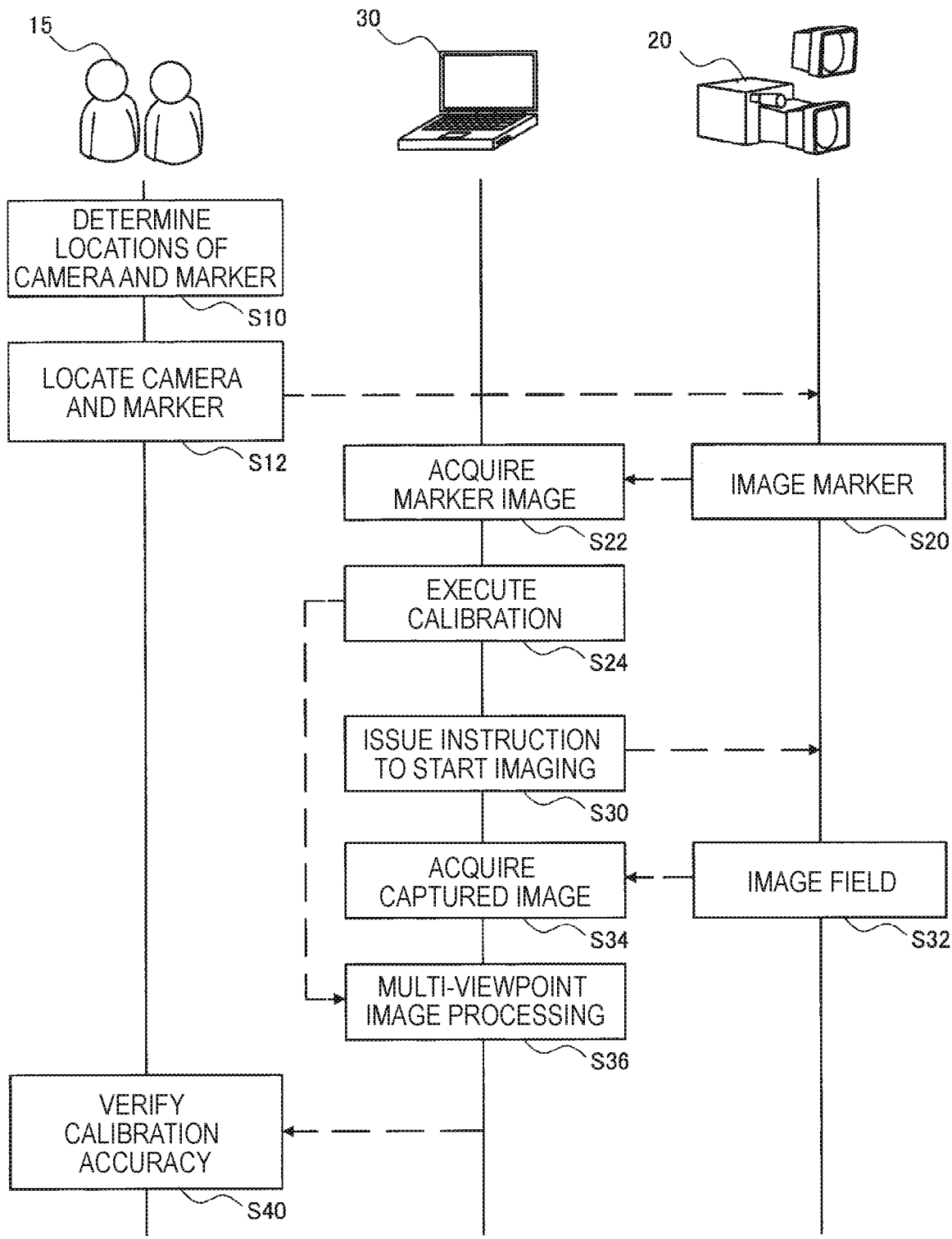
FIG. 3 is a sequence diagram for describing an example of an existing technique for calibration of a multi-camera system.

FIG. 3 is a sequence diagram for describing an example of an existing technique for calibration of the multi-camera system as illustrated in FIG. 1 and FIG. 2. An operator 15, a plurality of cameras 20, and the server 30 are involved in the calibration technique shown in FIG. 3.

First, when deploying the multi-camera system in an imaging space, the operator 15 determines locations of cameras and a marker in advance (step S10). The marker is an object utilized for calibration and having a known visual pattern. Calibration may be performed by deriving the locations of the cameras from how the marker is seen in a captured image using the location of the marker in the imaging space, for example, as a reference. Here, an artificial marker whose location can be moved by the operator 15 shall be utilized (in the case where the marker is a natural marker inherent in the imaging space, the location of the marker is not determined by the operator 15, but may be defined in a fixed manner). Then, the operator 15 locates the cameras and the marker in the imaging space in accordance with the determination in step S10 (step S12).

Next, the cameras 20 each image the marker to generate marker images (step S20). Then, the cameras 20 transmit the generated marker images to the server 30. The server 30 acquires the marker images from the cameras 20 (step S22), and executes calibration (step S24). For example, in the case where the camera 20a and the camera 20b image one common marker from respective viewpoints, the relative positional relationship between the camera 20a and the camera 20b (or the relationship between angles of view) can be learned using two marker images from these cameras.

Thereafter, the artificial marker is removed from the imaging space according to necessity, and the server 30 instructs each camera 20 to start imaging (step S30). Each camera 20 images a field which is a target of imaging (step S32), and transmits a captured image to the server 30. The server 30 collects captured images from the plurality of cameras 20 (step S34), and executes multi-viewpoint image processing (step S36). The multi-viewpoint image processing executed here may be any type of processing such as synchronous recording of a plurality of images, stitching of images, or analysis of a three-dimensional motion of a subject. In the multi-viewpoint image processing, the result of calibration (for example, the positional relationship between the cameras) in step S24 may be utilized. Steps S32 to S36 may be repeated at any number of times.

The operator 15 verifies the calibration accuracy according to necessity (step S40). According to an existing technique, whether or not sufficient calibration accuracy is obtained is unknown until the cameras and the marker are actually located. In the case where it is determined that sufficient calibration accuracy has not been obtained, the operator 15 changes the locations of the cameras and the marker. This suggests that trial and error may be performed for the locations of the cameras and the marker before full-scale operation of the system is started.

[1-3. Employment of Calibration Camera]

The locations of cameras suitable for imaging a field which is a target of imaging (or a subject in the field) is not necessarily suitable for calibration. Conversely, when optimizing the locations of the cameras for calibration, the locations may not be capable of sufficiently withdrawing attraction of captured images as a content. Thus, in one embodiment of the technology according to the present disclosure, in addition to a plurality of imaging cameras that image the imaging space, a calibration camera to be involved in calibration for the locations of those imaging cameras may be employed. The locations of the imaging cameras in the imaging space may be determined in advance from the perspective of increasing attraction of the content, for example. On the other hand, the location of the calibration camera is determined so as to optimize the calibration accuracy assuming that the locations of the plurality of imaging cameras are given. The calibration camera may be removed from the imaging space once calibration is terminated.

Figure 4:
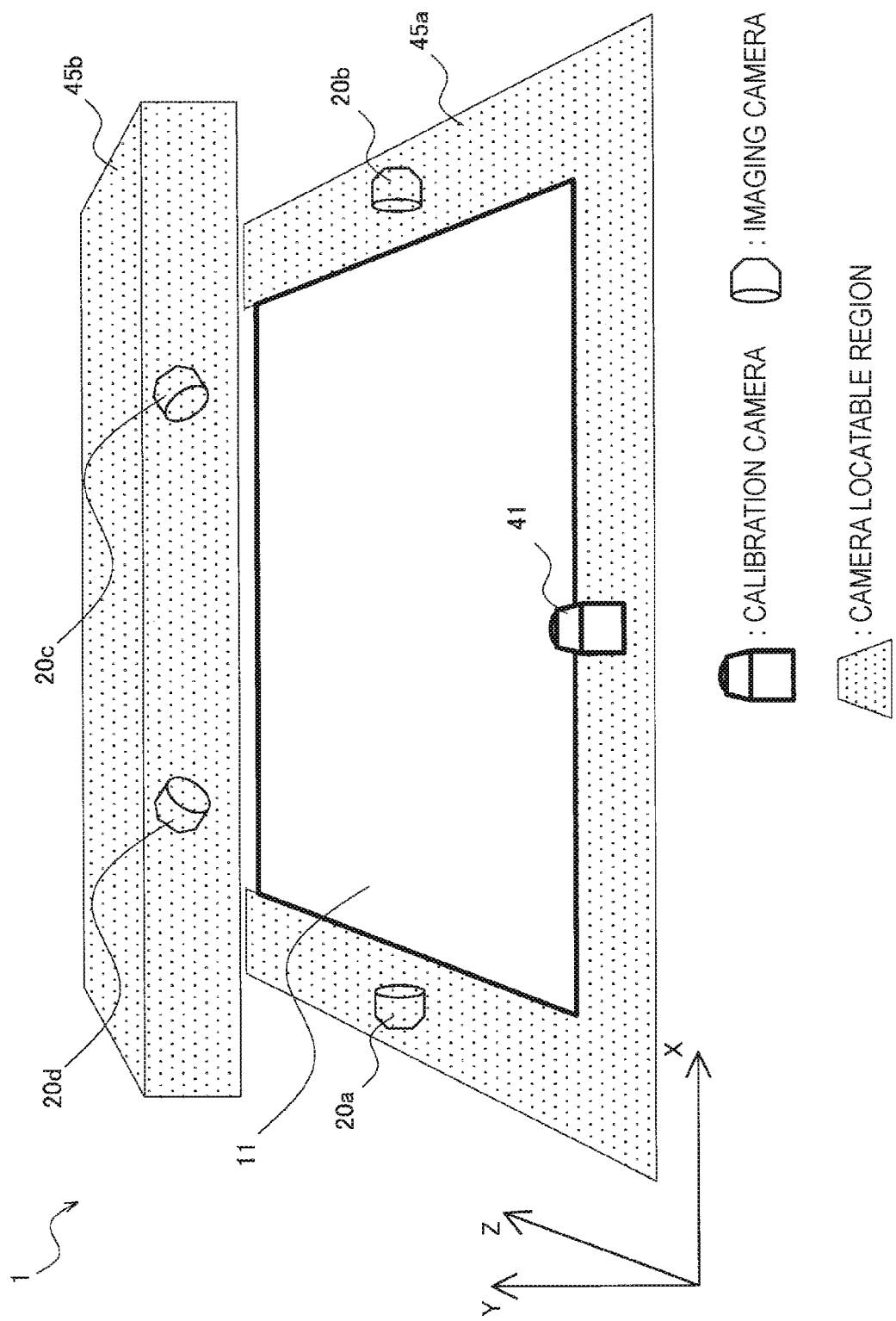
FIG. 4 is an explanatory diagram for describing a location of a calibration camera employed in one embodiment.

FIG. 4 is an explanatory diagram for describing a location of a calibration camera employed in one embodiment. With reference to FIG. 4, a multi-camera system 1 includes the imaging cameras 20a, 20b, 20c, and 20d, and a calibration camera 41. The imaging cameras 20a, 20b, 20c, and 20d are located at respective different positions in the imaging space and at different attitudes. The locations of the imaging cameras 20a, 20b, 20c, and 20d are determined such that the most attractive multi-viewpoint image content is provided through imaging of the field 11, for example. The calibration camera 41 is located in a camera locatable region at a position and an attitude that optimize the calibration accuracy. A first camera locatable region 45a around the field 11 and a second camera locatable region 45b above the field 11 in a three-dimensional imaging space are shown in FIG. 4.

Figure 5:
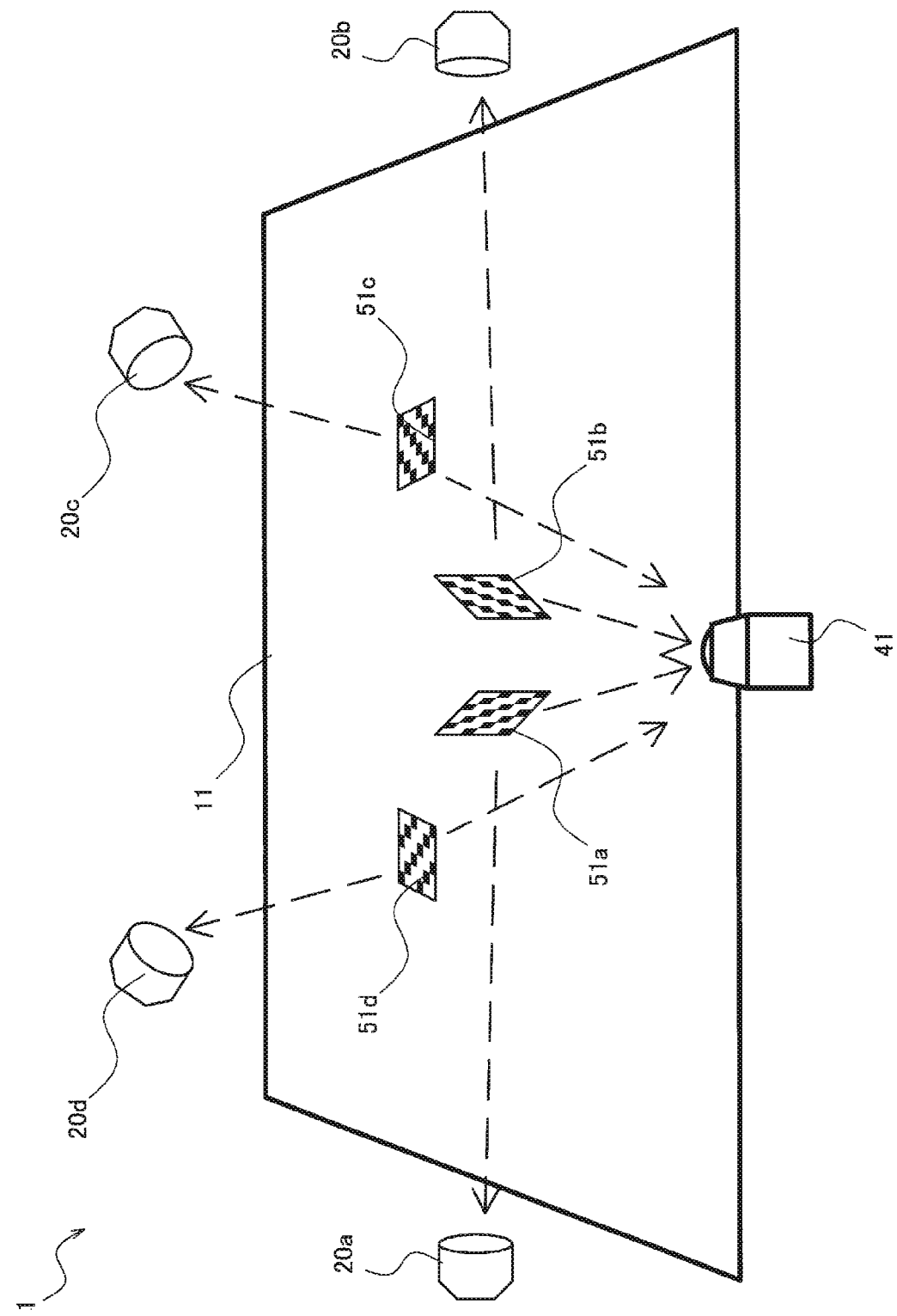
FIG. 5 is an explanatory diagram for describing calibration of imaging cameras through use of the calibration camera.

FIG. 5 is an explanatory diagram for describing calibration of imaging cameras through use of the calibration camera. With reference to FIG. 5, the multi-camera system 1 similar to FIG. 4 that includes the imaging cameras 20a, 20b, 20c, and 20d as well as the calibration camera 41 is shown again. Further, markers 51a, 51b, 51c, and 51d are located in the field 11. Here, the calibration camera 41 has the role as the reference camera in the above-described reference camera method. Then, calibration of the imaging camera 20a is performed by the imaging camera 20a and the calibration camera 41 imaging the marker 51a. Calibration of the imaging camera 20b is performed by the imaging camera 20b and the calibration camera 41 imaging the marker 51b. Calibration of the imaging camera 20c is performed by the imaging camera 20c and the calibration camera 41 imaging the marker 51c. Calibration of the imaging camera 20d is performed by the imaging camera 20d and the calibration camera 41 imaging the marker 51d. In this manner, by employing the calibration camera 41 located so as to solely optimize the calibration accuracy and utilizing the calibration camera 41 as the reference camera in the reference camera method, the above-described trade-off concerning optimization of the camera location can be resolved. Note that an example in which one marker is present for one imaging camera is shown here, whilst the relationship between an imaging camera and a marker is not necessarily one to one. For example, one common marker may be imaged for calibration of two or more imaging cameras. In addition, two or more markers may be imaged for calibration of one imaging camera.

Figure 6:
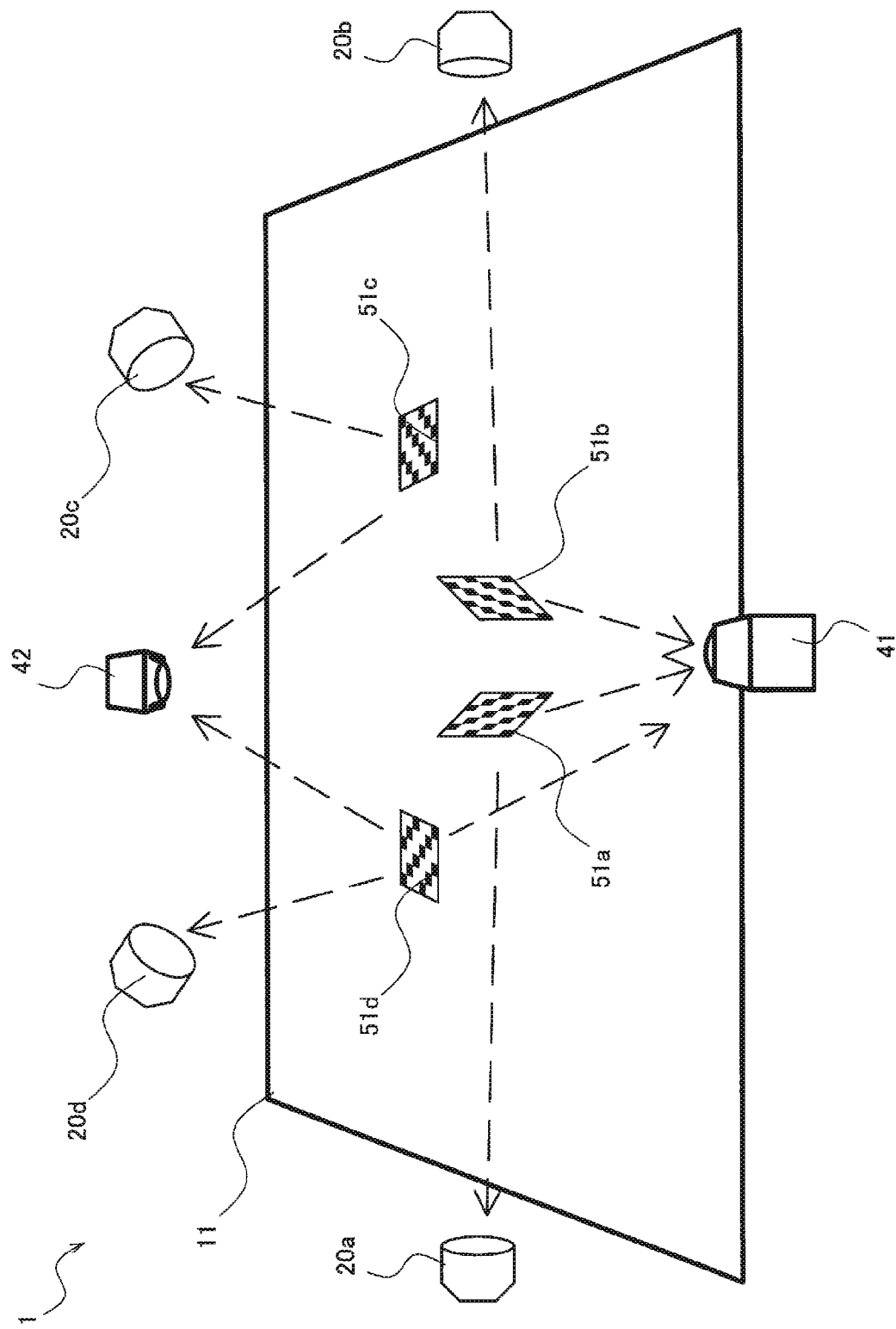
FIG. 6 is an explanatory diagram for describing addition of a calibration camera.

In one embodiment, the multi-camera system may include two or more calibration cameras. FIG. 6 is an explanatory diagram for describing addition of a calibration camera. With reference to FIG. 6, the multi-camera system 1 includes a calibration camera 42 in addition to the imaging cameras 20a, 20b, 20c, and 20d as well as the calibration camera 41. The calibration camera 42 may be added to the system in the case where it is determined that sufficient calibration accuracy is not achieved as the whole system merely by utilizing the single calibration camera 41 as the reference camera, for example. In the example of FIG. 6, calibration of the imaging camera 20a is performed by the imaging camera 20a and the calibration camera 41 imaging the marker 51a. Calibration of the imaging camera 20b is performed by the imaging camera 20b and the calibration camera 41 imaging the marker 51b. Calibration of the imaging camera 20c is performed by the imaging camera 20c and the calibration camera 42 imaging the marker 51c. Calibration of the imaging camera 20d is performed by the imaging camera 20d and the calibration camera 42 imaging the marker 51d. Then, when both of the calibration camera 41 and the calibration camera 42 image the marker 51d and the above-described sequential method is applied, calibration results of the imaging cameras 20a and 20b and calibration results of the imaging camera 20c and 20d can be integrated.

Note that, in one embodiment, after the calibration cameras are located so as to solely optimize the calibration accuracy and calibration of the imaging cameras is performed, the calibration cameras may also be utilized for the purpose of imaging the imaging space.

[1-4. Introduction of Calibration Accuracy Evaluation Device]

Further, in one embodiment of the technology according to the present disclosure, the location of the calibration camera is determined by a calibration accuracy evaluation device newly introduced, rather than being determined by an operator in the trial-and-error manner as in the existing technique.

Figure 7:
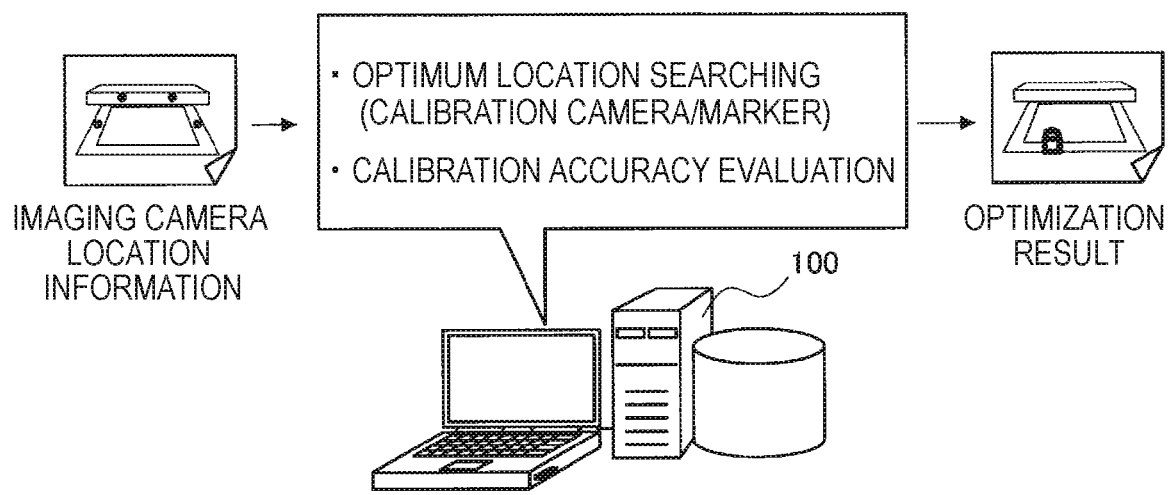
FIG. 7 is an explanatory diagram for describing an application of a calibration accuracy evaluation device according to one embodiment.

FIG. 7 is an explanatory diagram for describing an application of a calibration accuracy evaluation device 100 according to one embodiment. In the example of FIG. 7, the calibration accuracy evaluation device 100 is an information processing device. The calibration accuracy evaluation device 100 may have, for example, a processor such as a central processing unit (CPU), a non-volatile memory such as a read only memory (ROM), and a volatile memory such as a random access memory (RAM). The calibration accuracy evaluation device 100 acquires, for example, imaging camera location information indicating the locations of a plurality of imaging cameras located in an imaging space, as input information. Note that the camera location information acquired as input information may indicate the location of each camera with significantly coarse accuracy as compared with location information derived in later calibration processing. Then, the calibration accuracy evaluation device 100 evaluates the calibration accuracy obtained in the case of locating the calibration camera in the imaging space on the basis of the location of each of the plurality of imaging cameras and a temporal location of the calibration camera. Evaluation of the calibration accuracy may be performed by calculating one or more evaluation indexes. The calibration accuracy evaluation device 100 calculates the evaluation index for various (temporal) locations of the calibration camera (and a marker according to necessity), and determines that a location indicating the most favorable score is the optimum location. The calibration accuracy evaluation device 100 may display the result of optimization (that is, the optimum location of the calibration camera (and the marker)) on a monitor, store the result of optimization in a memory, or print the result of optimization.

A user (for example, an operator) can easily learn the location of the calibration camera for performing calibration of the multi-camera system with good accuracy merely by inputting the imaging camera location information and other several pieces of supplementary information to the calibration accuracy evaluation device 100. An example of a specific configuration of such a calibration accuracy evaluation device 100 will be described in detail in the next and subsequent sections.

2. CONFIGURATION OF CALIBRATION ACCURACY EVALUATION DEVICE ACCORDING TO ONE EMBODIMENT

Figure 8:
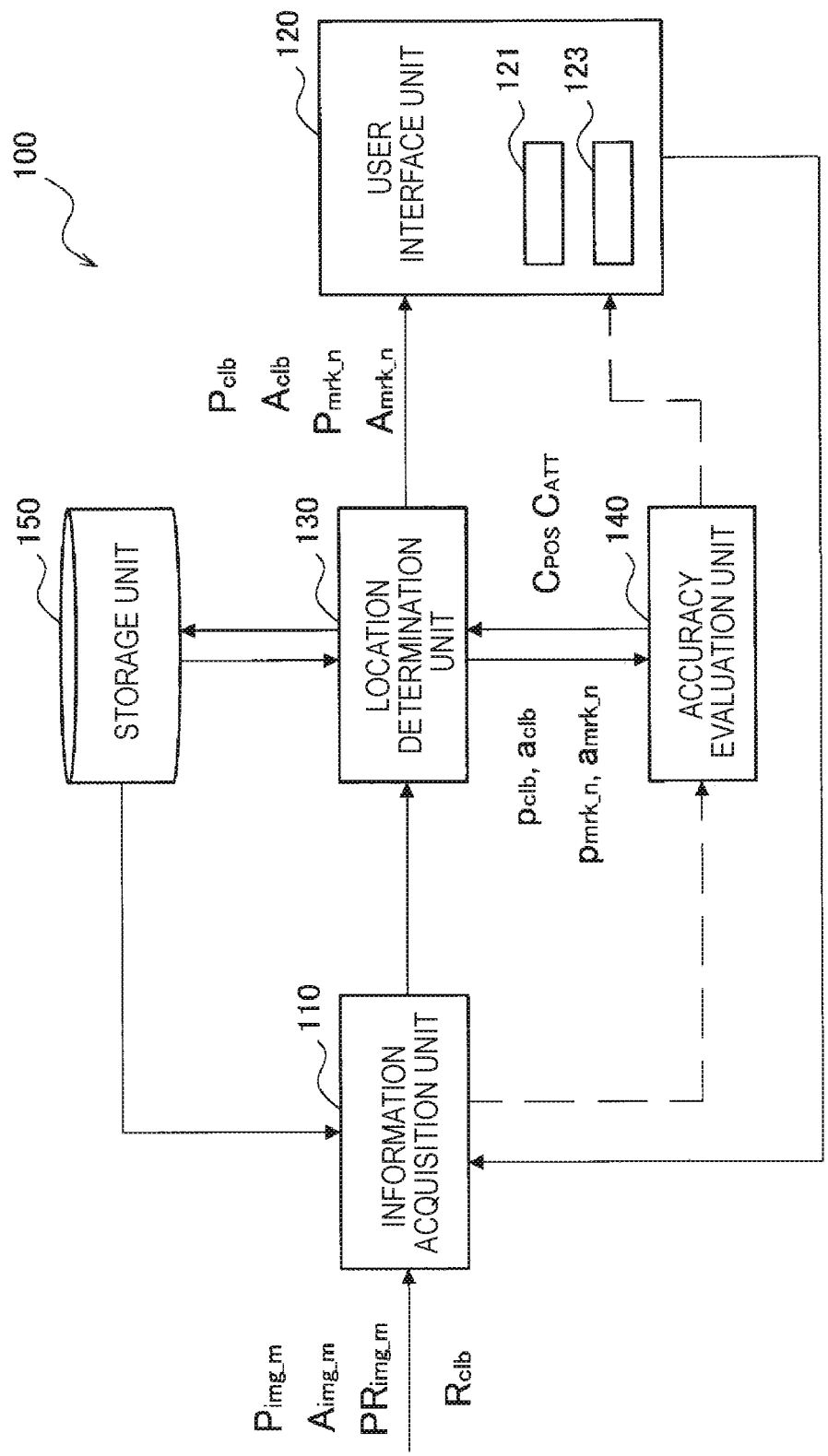
FIG. 8 is a block diagram showing an example of a configuration of the calibration accuracy evaluation device according to one embodiment.

FIG. 8 is a block diagram showing an example of a configuration of the calibration accuracy evaluation device 100 according to one embodiment. With reference to FIG. 8, the calibration accuracy evaluation device 100 includes an information acquisition unit 110, a user interface unit 120, a location determination unit 130, an accuracy evaluation unit 140, and a storage unit 150.

The information acquisition unit 110 acquires input information for executing an evaluation of the calibration accuracy and optimization of the location of the calibration camera in the calibration accuracy evaluation device 100. The input information acquired by the information acquisition unit 110 at least includes imaging camera location information indicating locations of a plurality of imaging cameras in an imaging space. The imaging camera location information includes, for example, an imaging camera position $P_{img\_m}$ and an imaging camera attitude $A_{img\_m}$ (m=1, M) for each of M imaging cameras. Further, the input information acquired by the information acquisition unit 110 includes camera parameter information $PR_{img\_m}$ (m=1, M) for each of the M imaging cameras. The camera parameter information may be a set of camera internal parameters required for calibration of the imaging cameras, and may include, for example, respective parameters representing the focal length, angle of view, aspect ratio, and skew (distortion). Further, the input information acquired by the information acquisition unit 110 may also include camera locatable region information $R_{clb}$ that defines a region in which the calibration camera can be located. These pieces of input information may be input via some input means of the user interface unit 120, may be previously stored by the storage unit 150, or may be acquired from another device via a communication interface not shown. The information acquisition unit 110 outputs the acquired input information to the location determination unit 130.

The user interface unit 120 may include an input interface 121 for input of an instruction or information to the calibration accuracy evaluation device 100 performed by the user, and a display interface 123 for displaying information. The input interface 121 may include, for example, a touch panel, a keypad, a keyboard, a mouse, a touch pad, or the like. The display interface 123 may include a monitor such as a liquid crystal display or an organic light-emitting diode (OLED) display, or a projector.

The location determination unit 130 executes searching processing for determining the optimum location of the calibration camera located in the imaging space. The location determination unit 130 sets one candidate location $p_{clb}$, $a_{clb}$ of the calibration camera within the range of the camera locatable region defined by the camera locatable region information $R_{clb}$, for example, and causes the accuracy evaluation unit 140 to evaluate the calibration accuracy for the set candidate location. The evaluation of the calibration accuracy herein is performed by calculating one or more evaluation indexes on the basis of a temporal location (that is, a candidate location) of the calibration camera, rather than actually executing calibration and measuring the accuracy. The location determination unit 130 repeats such setting of the candidate location and an evaluation of the calibration accuracy for each of a plurality of candidate locations, and determines the location of the calibration camera in accordance with a candidate location evaluated as having the optimum calibration accuracy.

In the case where an unfixed marker is utilized for calibration, the location determination unit 130 may also set a candidate location $p_{mrk\_n}$, $a_{mrk\_n}$ (n=1, ..., N) for each of N markers, and may supply the candidate location $p_{mrk\_n}$, $a_{mrk\_n}$ to the accuracy evaluation unit 140 as an input of an evaluation of the calibration accuracy. In the case where a fixed natural marker inherent in the imaging space is utilized, the location of the marker is previously defined, and that location information may be supplied to the accuracy evaluation unit 140. Hereinafter, it is assumed for ease of description that the number of markers N is equal to the number of imaging cameras M, and one marker is imaged for calibration of one imaging camera. However, the technology according to the present disclosure is also applicable to the case where the number of markers N is different from the number of imaging cameras M.

The accuracy evaluation unit 140 evaluates the calibration accuracy obtained in the case of locating the calibration camera in the imaging space on the basis of the location $P_{img\_m}$, $A_{img\_m}$ of each of the M imaging cameras and the candidate location $p_{clb}$, $a_{clb}$ of the calibration camera. The accuracy evaluation unit 140 may evaluate the calibration accuracy also on the basis of the location of each of the N markers assuming that the N markers to be imaged for calibration of the imaging cameras are also located in the imaging space. As described above, in a certain case, both of the location of the calibration camera and the location of each of the N markers are variable parameters in searching for the optimum calibration accuracy, and the location of the calibration camera and the location of each of the N markers are determined through the searching. In another case, the location of each of the N markers is fixed, and only the location of the calibration camera is a variable parameter in searching.

Generally, the calibration accuracy increases as a marker is reflected in a larger size (at higher resolution) in a marker image captured in calibration. Hence, in order to increase the calibration accuracy as the whole system, it is desirable that, at a place not distant on average from the calibration camera and any of the imaging cameras, respective corresponding markers are positioned. If there is a camera whose marker to be imaged is positioned extremely distant, sufficient calibration accuracy is not achieved. Thus, as an example, the accuracy evaluation unit 140 evaluates the calibration accuracy using a first evaluation index concerning variations in distance between a camera and a marker corresponding to the camera. The first evaluation index is an index to be utilized mainly for searching for the camera position. Here, the first evaluation index is referred to as a position evaluation index $C_{POS}$. The position evaluation index $C_{POS}$ is defined by Expression (1) below, for example.

[Math. 1]

$$C_{POS} = \sum_{i}^{M} (D_i - D_{ave})^2 + \sum_{j}^{N} (d_j - d_{ave})^2 \quad (1)$$

$$D_i = |p_{mrk\_i} - P_{img\_i}| \quad (2)$$

$$d_j = |p_{mrk\_j} - p_{clb}| \quad (3)$$

$D_i$ included on the right side of Expression (1) represents the distance between a (candidate) position $p_{mrk\_i}$ of an i-th marker and a position $P_{img\_i}$ of an i-th imaging camera corresponding to the marker (see Expression (2)). $D_{ave}$ represents the average value of the distance $D_i$ among M pairs of a marker and an imaging camera, $d_j$ included on the right side of Expression (1) represents the distance between a (candidate) position $p_{mrk\_j}$ of a j-th marker and the position $p_{clb}$ of the calibration camera (see Expression (3)), and $d_{ave}$ represents the average value of the distance $d_j$ among N pairs of a marker and a calibration camera.

Figure 9A:
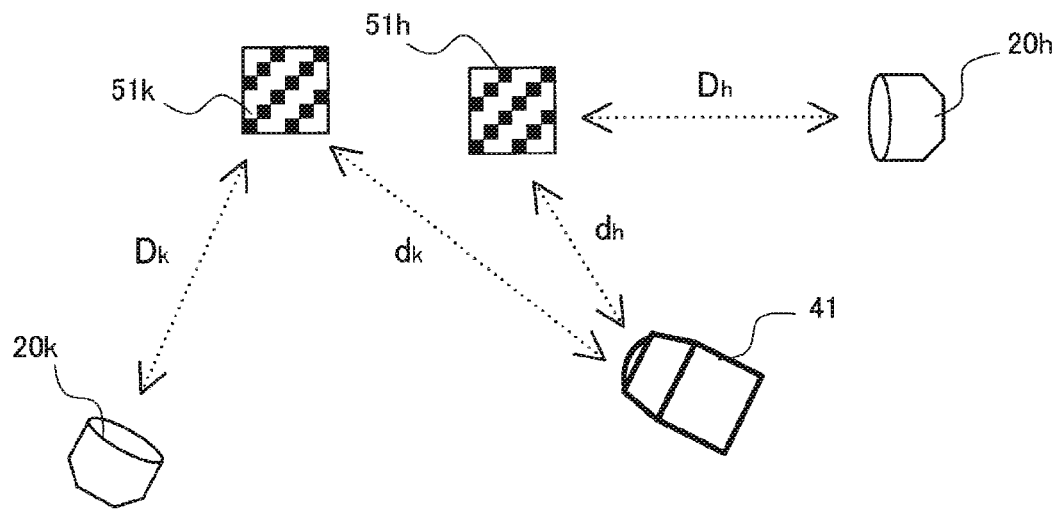
FIG. 9A is an explanatory diagram for describing an example of a position evaluation index.

FIG. 9A is an explanatory diagram provided for understanding of intermediate parameters D and d defined by Expression (2) and Expression (3), respectively. In FIG. 9A, a distance $D_k$ represents the distance between a k-th marker 51k and a k-th imaging camera 20k. A distance $D_h$ represents the distance between an h-th marker 51h and an h-th imaging camera 20h. A distance $d_k$ represents the distance between the k-th marker 51k and the calibration camera 41 temporarily located. A distance $d_h$ represents the distance between the h-th marker 51h and the calibration camera 41 temporarily located.

When the position evaluation index $C_{POS}$ is calculated by the accuracy evaluation unit 140 for candidate positions of all the possible calibration cameras and candidate positions of the markers, the location determination unit 130 can determine a position $P_{clb}$ of the optimum calibration camera and a position $P_{mrk\_n}$ of the N markers as a dataset that minimizes the position evaluation index $C_{POS}$ as in the following expression.

[Math. 2]

$$(P_{clb}, P_{mrk\_1}, \ldots, P_{mrk\_N}) = \min_{p_{clb}, p_{mrk\_n}} C_{POS} \quad (4)$$

In addition, generally, the calibration accuracy increases as a marker is reflected more closely to the center of a marker image captured in calibration. In the case where the marker to be imaged is reflected at an edge of the marker image, a marker pattern may be greatly affected by a lens distortion, and the calibration accuracy may be reduced. Further, the calibration accuracy increases as the marker is directed toward the front in the marker image. In the case where the marker is a two-dimensional marker, in the case where the marker is reflected in the marker image at a shallow angle (the marker is directed sideways, for example), the calibration accuracy may be reduced in any way. Hence, in order to increase the calibration accuracy as the whole system, it is desirable that the angle made by an optical path that connects each camera and marker with respect to the optical axis of each camera is as small as possible, and that the angle made by the optical path that connects each camera and marker with respect to the normal of a calibration pattern of the marker is as small as possible. Thus, the accuracy evaluation unit 140 evaluates the calibration accuracy using a second evaluation index concerning the relationship between the optical path between a camera and a marker and the attitude of the camera or the marker. The second evaluation index is an index to be utilized mainly for searching for a camera attitude. Here, the second evaluation index is referred to as an attitude evaluation index $C_{ATT}$. The attitude evaluation index $C_{ATT}$ is defined by Expression (5) below, for example.

[Math. 3]

$$C_{ATT} = \sum_{i}^{M} (\cos\alpha_i + \cos\beta_i) + \sum_{j}^{N} (\cos\gamma_j + \cos\delta_j) \quad (5)$$

$$\alpha_i = Ang(P_{mrk\_i}, P_{img\_i}, A_{img\_i}) \quad (6)$$

$$\beta_i = Ang(P_{mrk\_i}, P_{img\_i}, a_{mrk\_i}) \quad (7)$$

$$\gamma_j = Ang(P_{mrk\_j}, P_{clb}, a_{clb}) \quad (8)$$

$$\delta_j = Ang(P_{mrk\_j}, P_{clb}, a_{mrk\_j}) \quad (9)$$

$\alpha_i$ included on the right side of Expression (5) represents the angle made by the optical path between a position $P_{mrk\_i}$ of the i-th marker and the position $P_{img\_i}$ of the i-th imaging camera with respect to an attitude $A_{img\_i}$ of the i-th imaging camera (see Expression (6)). $\beta_i$ represents the angle made by the optical path between the position $P_{mrk\_i}$ of the i-th marker and the position $P_{img\_i}$ of the i-th imaging camera with respect to a (candidate) attitude $a_{mrk\_i}$ of the i-th marker (see Expression (7)). $\gamma_j$ included on the right side of Expression (5) represents the angle made by the optical path between a position $P_{mrk\_j}$ of the j-th marker and the position $P_{clb}$ of the calibration camera with respect to the attitude alb of the calibration camera (see Expression (8)). $\delta_j$ represents the angle made by the optical path between the position $P_{mrk\_j}$ of the j-th marker and the position $P_{clb}$ of the imaging camera with respect to a (candidate) attitude $a_{mrk\_j}$ of the j-th marker (see Expression (9)).

Figure 9B:
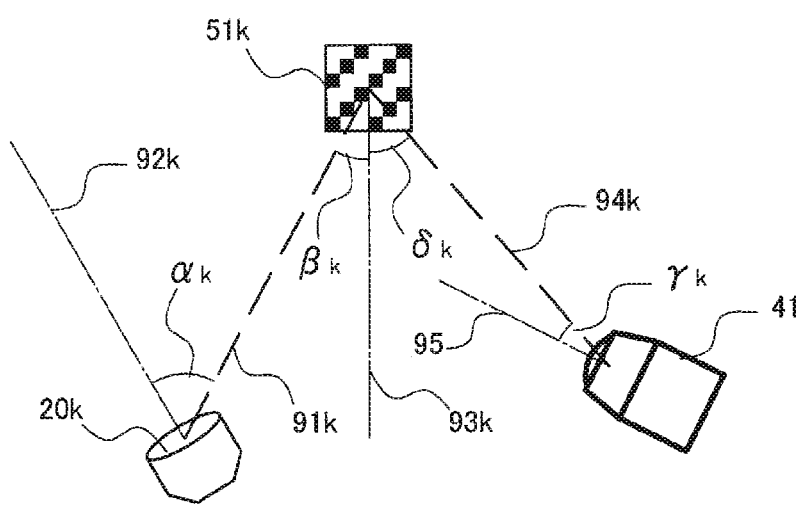
FIG. 9B is an explanatory diagram for describing an example of an attitude evaluation index.

FIG. 9B is an explanatory diagram provided for understanding of the intermediate parameters $\alpha$, $\beta$, $\gamma$, and $\delta$ defined by Expressions (6) to (9), respectively. In FIG. 9B, an angle $\alpha_k$ is the angle made by an optical path 91$k$ between the k-th marker 51$k$ and the k-th imaging camera 20$k$ with respect to an optical axis 92$k$ (equivalent to the attitude) of the k-th imaging camera 20$k$. An angle $\beta_k$ is the angle made by the optical path 91$k$ between the k-th marker 51$k$ and the k-th imaging camera 20$k$ with respect to a normal 93$k$ (equivalent to the attitude) of the k-th marker 51$k$. An angle $\gamma_k$ is the angle made by an optical path 94$k$ between the k-th marker 51$k$ and the calibration camera 41 with respect to an optical axis 95 (equivalent to the attitude) of the calibration camera 41. An angle $\delta_k$ is the angle made by the optical path 94$k$ between the k-th marker 51$k$ and the calibration camera 41 with respect to the normal 93$k$ (equivalent to the attitude) of the k-th marker 51$k$.

When the attitude evaluation index $C_{ATT}$ is calculated by the accuracy evaluation unit 140 for candidate attitudes of all the possible calibration cameras and candidate attitudes of markers, the location determination unit 130 can determine an attitude Alb of the optimum calibration camera and an attitude $A_{mrk\_n}$ of the N markers as a dataset that maximizes the attitude evaluation index $C_{ATT}$ as in the following expression.

[Math. 4]

$$(A_{clb}, A_{mrk\_1}, \ldots, A_{mrk\_N}) = \max_{a_{clb}, a_{mrk\_n}} C_{ATT} \quad (10)$$

The location determination unit 130 may determine the optimum location of the calibration camera (and the marker according to necessity) on the basis of the calibration accuracy indicated (expected) by the evaluation index calculated by the accuracy evaluation unit 140 using Expression (1) and Expression (5). The location determination unit 130 may select a plurality of position datasets in the order of scores of the position evaluation index $C_{POS}$, instead of selecting a single dataset indicating the optimum position for the calibration camera and the marker in accordance with Expression (4), for example, and may execute searching for attitudes that each comply with Expression (10) on the basis of those position datasets. In addition, the location determination unit 130 may output a single dataset indicating the optimum position and attitude of the calibration camera and the marker as a result of attitude searching, or may output a plurality of datasets in the order of scores of the evaluation index.

In one embodiment, the location determination unit 130 may verify whether or not a predetermined calibration accuracy condition is satisfied in the case where the calibration camera is located in a candidate location evaluated as having the optimum calibration accuracy. The predetermined calibration accuracy condition herein may be a condition based on at least one of the above-described position evaluation index $C_{POS}$ and the attitude evaluation index $C_{ATT}$, and may include one or more of the following, for example:

Condition 1) the position evaluation index $C_{POS}$ falls below a first threshold value Condition 2) the attitude evaluation index $C_{ATT}$ exceeds a second threshold value Note that the first threshold value compared with the position evaluation index $C_{POS}$ and the second threshold value compared with the attitude evaluation index $C_{ATT}$ may be variable values that depend upon the number of imaging cameras M or the number of markers N. In addition, these threshold values may be previously stored by the storage unit 150, or may be designated by a user via the user interface unit 120.

In the case where it is determined that the above-described calibration accuracy condition is not satisfied in the case where the calibration camera is located in the location obtained as a result of position and attitude searching, the location determination unit 130 may determine that an additional calibration camera is to be located in the imaging space. In the case where it is determined that an additional calibration camera is to be located in the imaging space, the location determination unit 130 may execute again position and attitude searching for determining the location of the additional calibration camera using the above-described position evaluation index $C_{POS}$ and the attitude evaluation index $C_{ATT}$ calculated by the accuracy evaluation unit 140. In this re-searching, the location determination unit 130 may cause the accuracy evaluation unit 140 to evaluate the calibration accuracy obtained for the additional calibration camera on the basis of the locations of the remaining imaging cameras obtained by excluding an imaging camera that can be favorably calibrated by the initial calibration camera (whose location has been established as a result of initial searching) from a plurality of imaging cameras.

FIG. 10 is an explanatory diagram for describing searching for the location of an additional calibration camera. In the example of FIG. 10, as a result of initial searching for position and attitude, it is assumed that the evaluation index calculated by the accuracy evaluation unit 140 for the combination of the initial calibration camera 41 and the markers 51$a$, 51$b$, 51$c$, and 51$d$ indicates the most favorable score, but that evaluation index does not satisfy the above-described calibration accuracy condition. Thus, the location determination unit 130 determines locating an additional calibration camera in the imaging space to improve the calibration accuracy as the whole system.

The location of the additional calibration camera may be determined through re-searching similar to the initial searching for position and attitude described above. However, for this re-searching, the location determination unit 130 selects an imaging camera that is more strongly related to degradation of the position evaluation index $C_{POS}$ and the attitude evaluation index $C_{ATT}$ in the initial searching, from among the imaging cameras 20$a$, 20$b$, 20$c$, and 20$d$. The imaging camera selected here may be an imaging camera having a longer distance to a corresponding marker or an imaging camera whose distance between a corresponding marker and the initial calibration camera is longer. In addition, the imaging camera selected here may be an imaging camera whose corresponding marker does not have a good attitude. In the example of FIG. 10, as an imaging camera that is more strongly related to degradation of the evaluation index in the initial searching, the imaging cameras 20c and 20d have been selected. The imaging cameras 20a and 20b are excluded from calculation of the evaluation index in re-searching as they can be favorably calibrated by the initial calibration camera 41. The locations of the markers 51a and 51b corresponding to the imaging cameras 20a and 20b, respectively, are established before re-searching. Then, the location determination unit 130 causes the accuracy evaluation unit 140 to evaluate the calibration accuracy expected for the additional calibration camera on the basis of the locations of fewer imaging cameras than in the initial searching to determine the location of the additional calibration camera for which the evaluation index indicates the most favorable score and the location of an unestablished marker. In the example of FIG. 10, it has been determined as a result of re-searching that the calibration camera 42 is to be located additionally. As an example, the location of the marker 51d corresponding to the imaging camera 20d may be maintained as a result of initial searching in order to enable integration of calibration results between the initial calibration camera 41 and the additional calibration camera 42. On the other hand, the location of a marker corresponding to the imaging camera 20c is set to be variable in re-searching, and it has been determined that a marker 51e is to be newly located.

Until it is determined that the above-described calibration accuracy condition is satisfied by the location of the initial calibration camera and zero or more additional calibration cameras, the location determination unit 130 may repeat an evaluation of the calibration accuracy and addition of a calibration camera. Then, when the above-described calibration accuracy condition is satisfied, the number and locations of calibration cameras that are to be located in the multi-camera system 1, and the locations of a marker group may all be established. Note that, in the case where the number of calibration cameras reaches a predetermined upper limit number, the location determination unit 130 may discontinue repetition of re-searching irrespective of whether or not the calibration accuracy condition is satisfied.

3. FLOW OF PROCESSING ACCORDING TO ONE EMBODIMENT

In the present section, an example of a flow of processing that may be executed by the above-described calibration accuracy evaluation device 100 will be described using several flowcharts. Note that, while a plurality of processing steps are described in the flowcharts, those processing steps may not necessarily be executed in the order indicated in the flowcharts. Several processing steps may be executed in parallel. In addition, additional processing steps may be employed, and some processing steps may be omitted.

[3-1. Location Optimization Processing]

Figure 11:
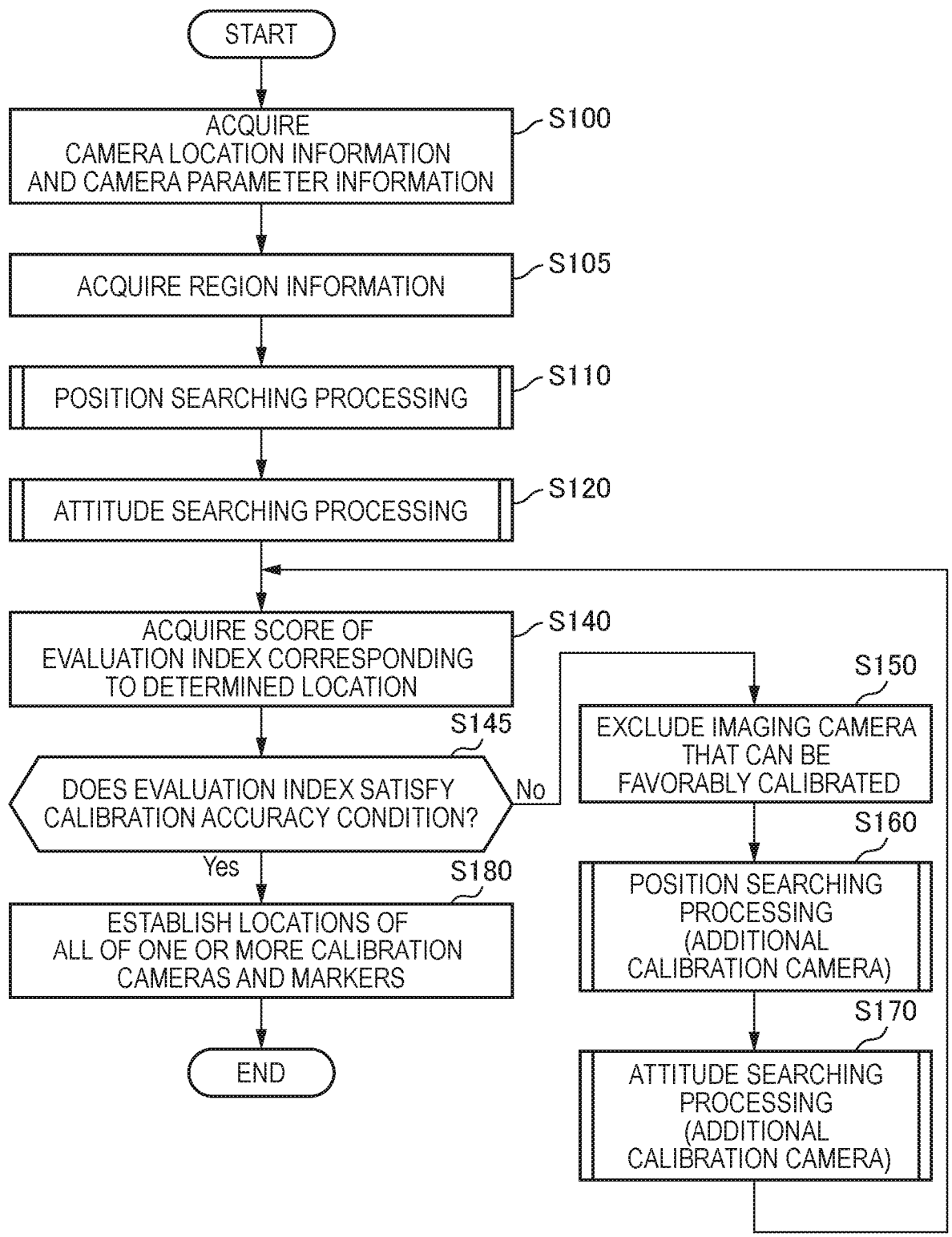
FIG. 11 is a flowchart showing an example of a flow of location optimization processing according to one embodiment.

FIG. 11 is a flowchart showing an example of a flow of location optimization processing according to one embodiment. The processing shown in FIG. 11 may be started in accordance with a trigger input by the user, for example, via the input interface 121 after the locations of a plurality of imaging cameras in the imaging space are determined.

First, the information acquisition unit 110 acquires imaging camera location information indicating the locations of the imaging cameras and camera parameter information indicating camera internal parameters of the imaging cameras (step S100). In addition, the information acquisition unit 110 acquires camera locatable region information that defines a region in which the calibration camera can be located (step S105).

Next, the location determination unit 130 executes position searching processing for determining the optimum position of the calibration camera (and marker) (step S110). The position searching processing executed here will be described later in more detail. The location determination unit 130 determines, as a result of position searching processing, the position of the optimum calibration camera within the range of the region indicated by the camera locatable region information. In addition, the location determination unit 130 may also determine the optimum position of one or more markers.

Next, the location determination unit 130 executes attitude searching processing for determining the optimum attitude of the calibration camera (and marker) (step S120). The attitude searching processing executed here will be described later in more detail. The location determination unit 130 determines, as a result of the attitude searching processing, the optimum attitude of the calibration camera at the position determined in step S110. In addition, the location determination unit 130 may also determine the optimum attitude of one or more markers.

Next, the location determination unit 130 acquires a score of evaluation index (for example, the position evaluation index and the attitude evaluation index) calculated by the accuracy evaluation unit 140, corresponding to the optimum location determined as a result of position searching processing and attitude searching processing (step S140). Then, the location determination unit 130 determines whether or not the evaluation index satisfies the calibration accuracy condition (step S145). In the case where the evaluation index satisfies the calibration accuracy condition, the process proceeds into step S180. On the other hand, in the case where the evaluation index does not satisfy the calibration accuracy condition, the process proceeds into step S150.

In step S150, the location determination unit 130 excludes an imaging camera that can be favorably calibrated by the initial calibration camera from the targets of evaluation in re-searching (step S150). Then, the location determination unit 130 executes the position searching processing for determining the optimum position of an additional calibration camera (and an unestablished marker) (step S160). The position searching processing executed here may be similar to the processing executed in step S110 except that some imaging cameras and corresponding markers are not considered. In addition, the location determination unit 130 executes attitude searching processing for determining the optimum attitude of an additional calibration camera (and an unestablished marker) (step S170). The attitude searching processing executed here may be similar to the processing executed in step S120 except that some imaging cameras and corresponding markers are not considered. As a result of these position searching processing and attitude searching processing, the optimum location of the additional calibration camera (and the optimum location of the marker having been unestablished) is/are determined.

Next, the location determination unit 130 acquires a score of evaluation index corresponding to the optimum location determined by re-searching (step S140), and determines whether or not the evaluation index satisfies the calibration accuracy condition (step S145). The location determination unit 130 repeats the processing in the above-described steps S140 to S170 until the above-described calibration accuracy condition is satisfied.

Then, when the calibration accuracy condition is satisfied (or when the number of calibration cameras reaches the predetermined upper limit number), the location determination unit 130 establishes the locations of all of one or more calibration cameras and markers (step S180).

[3-2. Position Searching Processing]

Figure 12:
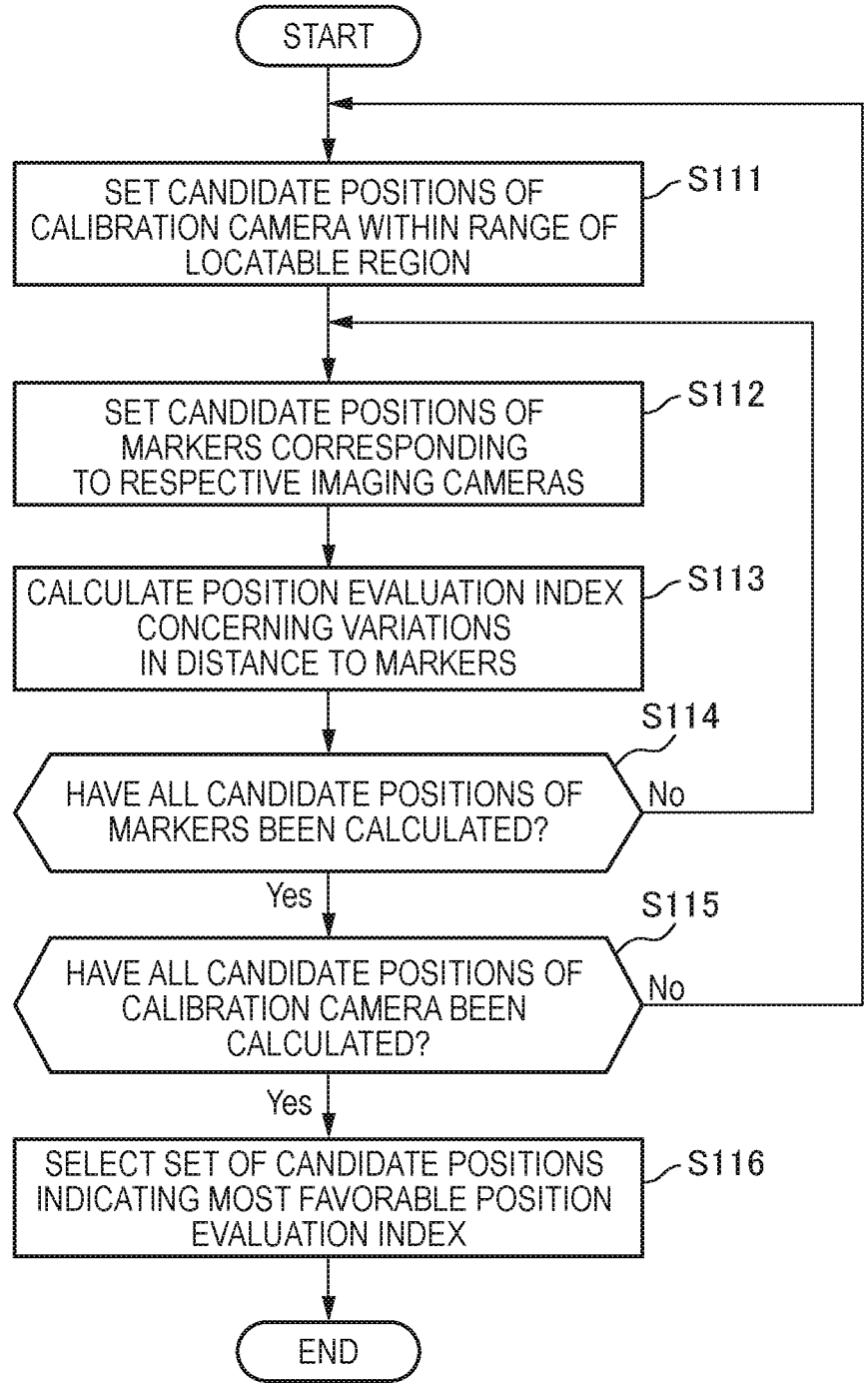
FIG. 12 is a flowchart showing an example of a detailed flow of position searching processing shown in FIG. 11.

FIG. 12 is a flowchart showing an example of a detailed flow of the position searching processing shown in FIG. 11.

With reference to FIG. 12, first, the location determination unit 130 sets candidate positions of the calibration camera for searching within the range of the locatable region indicated by the camera locatable region information (step S111). In addition, the location determination unit 130 sets candidate positions of markers corresponding to respective imaging cameras to be considered (step S112). Note that, in the case where the position of the markers is fixed, step S112 may be skipped.

Next, the accuracy evaluation unit 140 calculates the position evaluation index concerning variations in distance to the markers on the basis of candidate positions of the calibration camera, the position of the markers, and the position of the imaging cameras (step S113).

The location determination unit 130 repeats the above-described steps S112 and S113 until calculation of the position evaluation index is terminated for combinations of all the candidate positions of possible markers (step S114). In addition, the location determination unit 130 repeats the above-described steps S111 to S114 until calculation of the position evaluation index is terminated for all the candidate positions of the calibration cameras within a search range (step S115).

When the searching is terminated, the location determination unit 130 selects a set of candidate positions of the calibration camera and markers indicating the most favorable (or certain some superior) position evaluation index(es) (step S116).

[3-3. Attitude Searching Processing]

Figure 13:
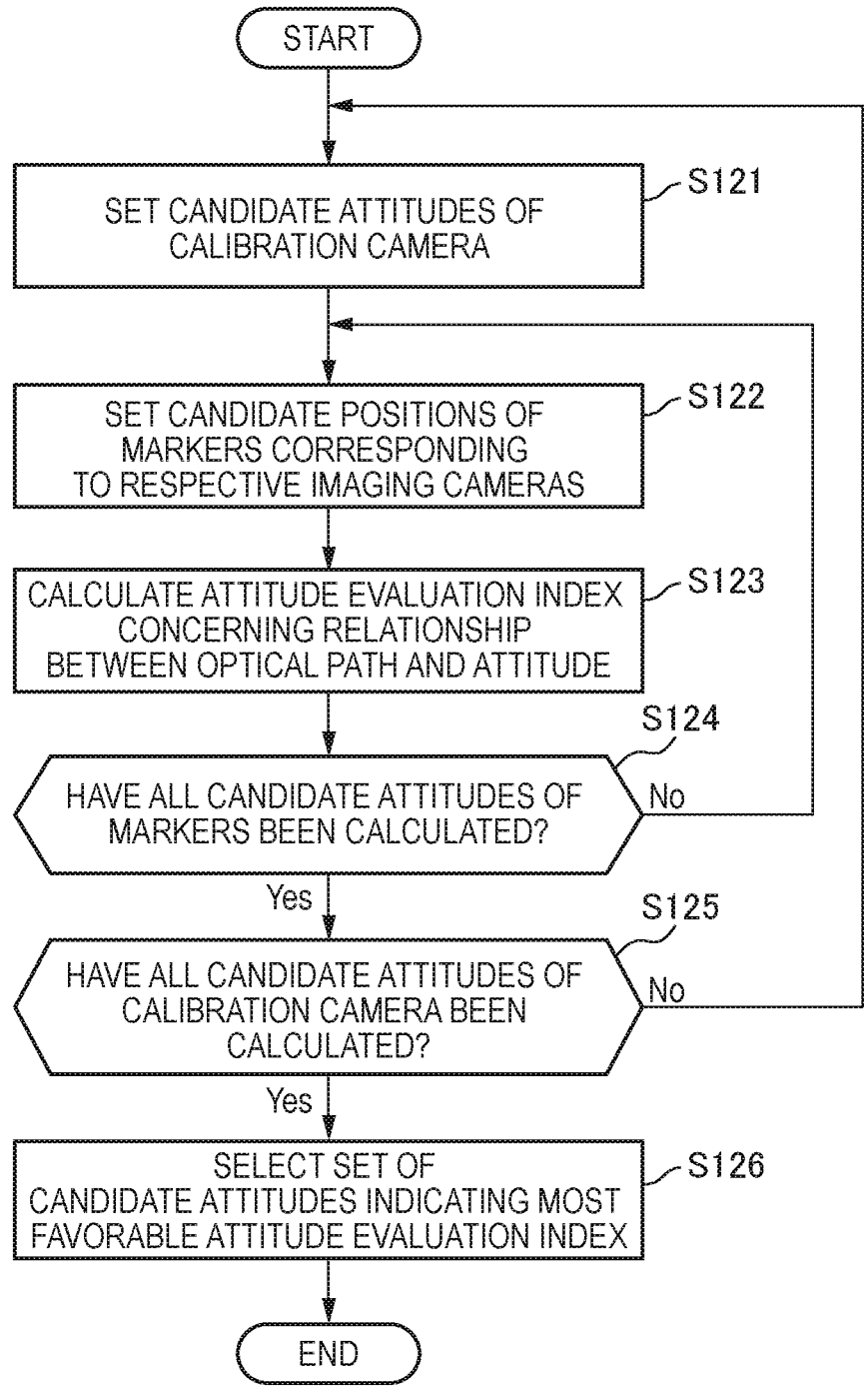
FIG. 13 is a flowchart showing an example of a detailed flow of attitude searching processing shown in FIG. 11.

FIG. 13 is a flowchart showing an example of a detailed flow of the attitude searching processing shown in FIG. 11.

With reference to FIG. 13, first, the location determination unit 130 sets candidate attitudes of the calibration camera for searching at the position of the calibration camera determined as a result of position searching processing (step S121). In addition, the location determination unit 130 sets candidate attitudes of markers corresponding to the respective imaging cameras to be considered (step S122). Note that, in the case where the attitude of the markers is fixed, step S122 may be skipped.

Next, the accuracy evaluation unit 140 calculates the attitude evaluation index concerning the relationship between the optical path between a camera and a marker and the attitude of the camera or the marker on the basis of the position and candidate attitudes of the calibration camera, the position and candidate attitudes of the markers, and the position and attitude of the imaging cameras (step S123).

The location determination unit 130 repeats the above-described steps S122 and S123 until calculation of the attitude evaluation index is terminated for combinations of all the candidate attitudes of possible markers (step S124). In addition, the location determination unit 130 repeats the above-described steps S121 to S124 until calculation of the attitude evaluation index is terminated for all the candidate attitudes of the calibration camera (step S125).

When the searching is terminated, the location determination unit 130 selects a set of candidate attitudes of the calibration camera and markers indicating the most favorable attitude evaluation index (step S126).

4. EMPLOYMENT OF OMNIDIRECTIONAL CAMERA

[4-1. Omnidirectional Camera as Calibration Camera]

An omnidirectional camera is a camera that may have an angle of view of 360° at both of an azimuth angle and an attack and depression angle. In the case where the omnidirectional camera is employed as a calibration camera, the attitude of the calibration camera hardly affects the calibration accuracy. Therefore, in this case, only the position of the calibration camera may be a target of substantial searching in the location optimization processing.

Figure 14:
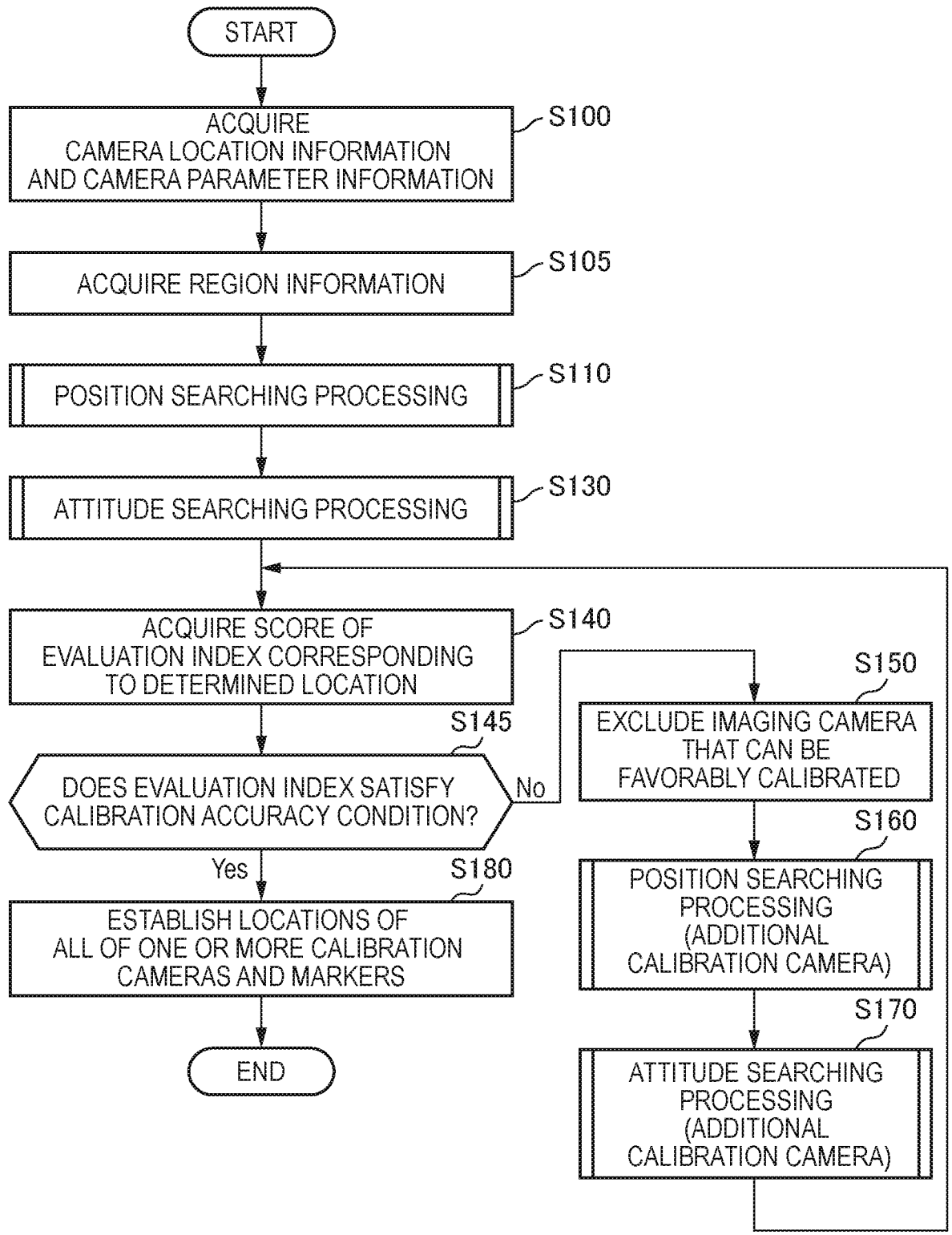
FIG. 14 is a flowchart showing an example of a flow of location optimization processing in the case where an omnidirectional camera is employed as a calibration camera.

FIG. 14 is a flowchart showing an example of a flow of location optimization processing in the case where an omnidirectional camera is employed as a calibration camera. The processing shown in FIG. 14 may be started in response to a trigger input by the user, for example, via the input interface 121 after the locations of a plurality of imaging cameras in the imaging space are determined.

First, the information acquisition unit 110 acquires imaging camera location information indicating the locations of the imaging cameras and camera parameter information indicating camera internal parameters of the imaging cameras (step S100). In addition, the information acquisition unit 110 acquires camera locatable region information that defines a region in which the calibration camera can be located (step S105).

Next, the location determination unit 130 executes the position searching processing for determining the optimum position of the calibration camera and markers (step S110). The position searching processing executed here may be similar to the processing described using FIG. 12.

Next, the location determination unit 130 executes the attitude searching processing for determining the optimum attitude of the markers (step S130). The attitude searching processing executed here will be described later in more detail.

Next, the location determination unit 130 acquires a score of evaluation index calculated by the accuracy evaluation unit 140, corresponding to the optimum location determined as a result of the position searching processing and the attitude searching processing (step S140). Then, the location determination unit 130 determines whether or not the evaluation index satisfies the calibration accuracy condition (step S145). In the case where the evaluation index does not satisfy the calibration accuracy condition, the location determination unit 130 excludes an imaging camera that can be favorably calibrated from the targets of evaluation (step S150), and executes position searching processing (step S160) for determining the optimum position of an additional calibration camera and an unestablished marker and attitude searching processing (step S170) for determining the optimum attitude of the unestablished marker.

The location determination unit 130 repeats the processing in the above-described steps S140 to S170 until the above-described calibration accuracy condition is satisfied (step S145). Then, when the calibration accuracy condition is satisfied (or when the number of calibration cameras reaches the predetermined upper limit number), the location determination unit 130 establishes the locations of all of one or more calibration cameras (omnidirectional cameras) and markers (step S180).

Figure 15:
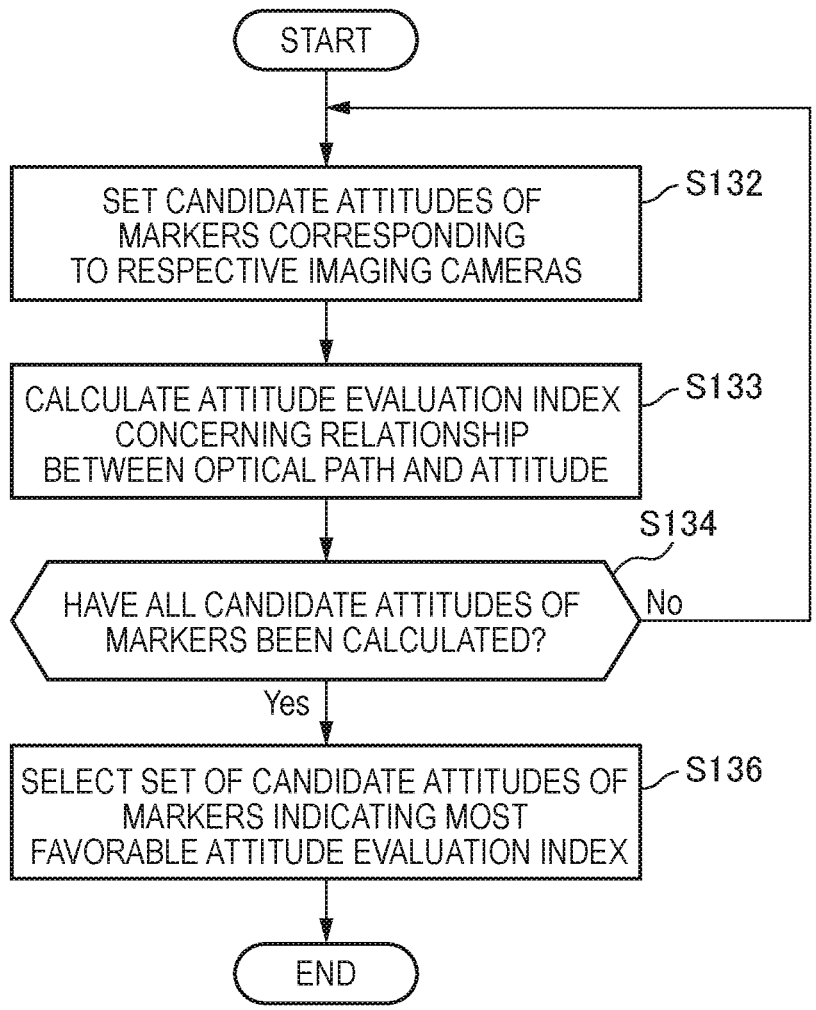
FIG. 15 is a flowchart showing an example of a detailed flow of attitude searching processing shown in FIG. 14.

FIG. 15 is a flowchart showing an example of a detailed flow of the attitude searching processing shown in FIG. 14. Note that, in the case where the attitude of the markers is fixed, the present attitude searching processing may not be executed.

With reference to FIG. 14, first, the location determination unit 130 sets candidate attitudes of markers corresponding to respective imaging cameras to be considered (step S132).

Next, the accuracy evaluation unit 140 calculates the attitude evaluation index concerning the relationship between the optical path between a camera and a marker and the attitude of the camera or the marker on the basis of the position of the calibration camera, the position and candidate attitudes of the markers, and the position and attitude of the imaging cameras (step S133). Since the omnidirectional camera is regarded as facing the front side with respect to every direction, the term of the angle $\gamma_j$ in the calculation formula (Expression (5)) of the attitude evaluation index $C_{ATT}$ may be omitted in the calculation of the attitude evaluation index here.

The location determination unit 130 repeats the above-described steps S132 and S133 until calculation of the attitude evaluation index is terminated for combinations of all the candidate attitudes of possible markers (step S134).

When the searching is terminated, the location determination unit 130 selects a set of candidate attitudes of markers indicating the most favorable attitude evaluation index (step S136).

[4-2. Omnidirectional Camera as Imaging Camera]

The omnidirectional camera itself may be configured as a set of a plurality of camera modules. When a slight image displacement between modules occurs when manufacturing such a multi-module type omnidirectional camera or deploying the multi-module type omnidirectional camera in an imaging space, the displacement may be a cause of reduction in image quality of an omnidirectional image. However, by determining the optimum locations of the calibration camera and markers on the basis of the locations of a plurality of camera modules using the above-described calibration accuracy evaluation device 100, calibration of the omnidirectional camera can be efficiently accomplished when deploying the multi-module type omnidirectional camera. In this case, the imaging camera location information acquired by the information acquisition unit 110 represents the location (position and attitude) of individual camera modules of the omnidirectional camera in the local coordinate system of the omnidirectional camera or a coordinate system of an assumed imaging space. When shipping the omnidirectional camera, for example, a manufacturer of the omnidirectional camera as an imaging camera may locate the calibration camera and markers in the imaging space in accordance with a location determined previously using the calibration accuracy evaluation device 100, and may accomplish calibration concurrently with an operation of attaching the omnidirectional camera at the site.

5. APPLICATION EXAMPLES

The calibration accuracy evaluation device 100 described in the previous sections may be utilized not only for searching for the optimum location of the calibration camera, but also for verification of the location of the additional calibration camera which is determined temporarily by an operator.

Figure 16:
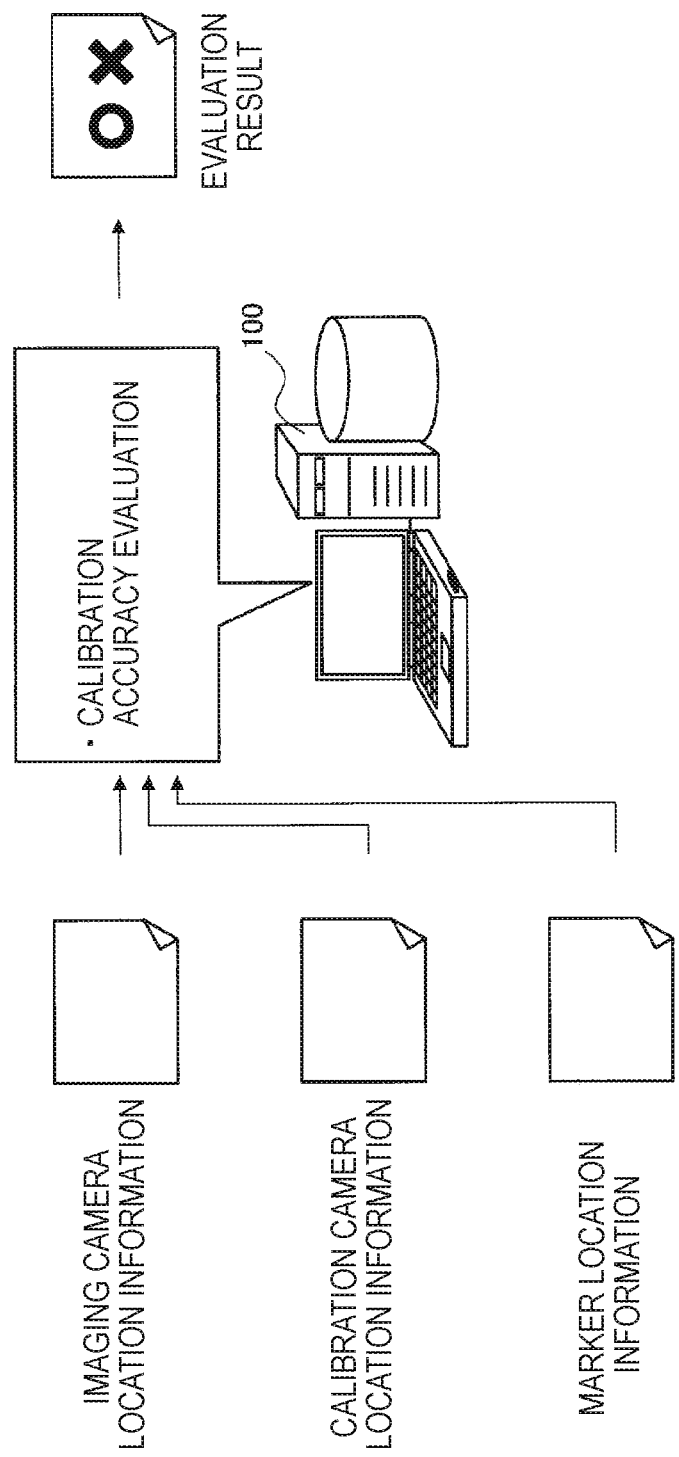
FIG. 16 is an explanatory diagram for describing another application of the calibration accuracy evaluation device according to one embodiment.

FIG. 16 is an explanatory diagram for describing an application of the calibration accuracy evaluation device 100 different from the application described using FIG. 7. In the example of FIG. 16, the information acquisition unit 110 of the calibration accuracy evaluation device 100 acquires, as input information, the calibration camera location information indicating the location of the calibration camera that may be temporarily determined, in addition to the imaging camera location information indicating the locations of a plurality of imaging cameras located in the imaging space. The information acquisition unit 110 may also acquire, as input information, marker location information indicating the locations of a plurality of markers that may be temporarily determined. Then, the accuracy evaluation unit 140 of the calibration accuracy evaluation device 100 evaluates the calibration accuracy expected for these locations temporarily determined by calculating the above-described position evaluation index and attitude evaluation index. The user interface unit 120 feeds back a result of evaluation of the calibration accuracy executed by the accuracy evaluation unit 140 to the user. Feedback of the result of evaluation of the calibration accuracy may be performed by a technique such as, for example, displaying on a monitor or printing scores themselves of the position evaluation index and attitude evaluation index or a determination result regarding whether or not each score satisfies the above-described calibration accuracy condition.

According to the above-described application examples, the user can easily learn whether or not good calibration accuracy can be obtained without, after temporarily determining the location of the calibration camera (and markers), actually locating the camera (and markers) in the imaging space and executing calibration. Hence, the burden of trial and error having been performed for calibration in existing techniques can be reduced, and deployment of the multi-camera system can be performed immediately.

6. CONCLUSION

An embodiment of the technology according to the present disclosure has been described so far in detail using FIGS. 1, 2, 3, 4, 5, 6, 7, 8, 9A, 9B, 10, 11, 12, 13, 14, 15, and 16. According to the above-described embodiment, an information processing device that acquires the camera location information indicating the locations of a plurality of imaging cameras located in the imaging space, and evaluates the calibration accuracy obtained in the case of locating the calibration camera in the above-described imaging space on the basis of the location of each of the imaging cameras and the location of the calibration camera indicated by the above-described camera location information is provided. Consequently, the necessity for the operator to perform trial and error for calibration of the cameras at the system deployment site is avoided. In addition, according to the above-described embodiment, since the locations of the imaging cameras may be determined previously without considering the calibration accuracy, attraction of a content to be imaged will not be lessened due to a change in location for the purpose of calibration.

In addition, according to the above-described embodiment, in addition to a plurality of imaging cameras, a calibration camera involved in calibration for the locations of those imaging cameras is employed, and the location of the calibration camera may be determined so as to optimize the calibration accuracy assuming that the locations of the plurality of imaging cameras are given. In this manner, since the calibration accuracy is optimized using the location (for example, the position and attitude, or in the case where the calibration camera is an omnidirectional camera, only the position) of the calibration camera as a variable parameter, calibration of cameras in the multi-camera system can be performed with good accuracy without moving the locations of the imaging cameras. Since the calibration camera may be utilized as the reference camera in the reference camera method, bundle adjustment required in the sequential method is in principle unnecessary, and calculation cost for calibration is suppressed. Once calibration is terminated, it is also possible to remove the calibration camera from the imaging space.

In addition, according to the above-described embodiment, the optimum location of the calibration camera located in the imaging space is determined on the basis of an evaluation result of the calibration accuracy obtained in the case of locating the calibration camera. Consequently, the operator can easily learn the location of the calibration camera for performing calibration of the multi-camera system with good accuracy merely by inputting imaging camera location information and other several pieces of supplementary information. For example, the operator can start calibration in a manner that good accuracy may be expected from the beginning by locating the calibration camera (and one or more markers according to necessity) in the imaging space in accordance with a location that may be displayed on the monitor or may be printed.

In addition, according to the above-described embodiment, the calibration accuracy may be evaluated assuming that one or more markers imaged for calibration of the imaging cameras are also located in the imaging space. Consequently, not only the location of the calibration camera, but also the locations of the markers for calibration can be optimized on the basis of the evaluation result of the calibration accuracy.

In addition, according to the above-described embodiment, the calibration accuracy may be evaluated for each of a plurality of candidate locations within the camera locatable region in which the calibration camera can be located, and the location of the calibration camera may be determined in accordance with a candidate location evaluated as having the optimum calibration accuracy. Consequently, the calibration camera can be located at the most favorable position within the range of the camera locatable region that differs depending on the situation of the imaging space and at the most favorable attitude.

In addition, according to the above-described embodiment, in the case where the calibration accuracy optimized first assuming that one calibration camera is located is not sufficient (in the case where it is determined that the predetermined calibration accuracy condition is not satisfied), the optimum location of a calibration camera additionally located in the imaging space may be further searched. Consequently, by changing the number of calibration cameras, the calibration accuracy that the multi-camera system has to achieve can be achieved reliably. In addition, an unnecessary large number of calibration cameras is prevented from being located.

In addition, according to a certain application example, what degree of calibration accuracy is expected may be evaluated for a location of the calibration camera which is temporarily determined by the operator, and a result of the evaluation may be fed back via a user interface. In this case, the operator can easily learn whether the location of the calibration camera is appropriate without repeating a change in camera location and actual measurement of the calibration accuracy in a trial-and-error manner.

Note that the series of processes described in this specification can be realized with any of software, hardware, and a combination of software and hardware. The programs included in the software are stored beforehand, for example, in the storage medium (non-transitory media) to be installed to the inside or the outside of each device. Then, each program is read into a RAM, for example, at the time of execution and executed by a processor such as a CPU.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an information acquisition unit configured to acquire camera location information indicating locations of a plurality of imaging cameras located in an imaging space; and an evaluation unit configured to evaluate calibration accuracy obtained in a case of locating a calibration camera in the imaging space on a basis of the location of each of the plurality of imaging cameras indicated by the camera location information and a location of the calibration camera.

(2)

The information processing device according to (1), further including:

a location determination unit configured to determine an optimum location of the calibration camera located in the imaging space on a basis of the calibration accuracy evaluated by the evaluation unit.

(3)

The information processing device according to (2), in which assuming that one or more markers to be imaged for calibration of the imaging cameras are also located in the imaging space, the evaluation unit evaluates the calibration accuracy on a basis of the location of each of the plurality of imaging cameras, the location of the calibration camera, and a location of each of the one or more markers.

(4)

The information processing device according to (3), in which the location determination unit causes the evaluation unit to evaluate the calibration accuracy for each of a plurality of candidate locations within a region in which the calibration camera can be located, and determines the location of the calibration camera in accordance with a candidate location evaluated as having optimum calibration accuracy.

(5)

The information processing device according to (4), in which the location determination unit searches for the optimum calibration accuracy using both of the location of the calibration camera and the location of each of the one or more markers as variable parameters, and determines the location of the calibration camera and the location of each of the one or more markers through the search.

(6)

The information processing device according to any one of (3) to (5), in which the evaluation unit evaluates the calibration accuracy using a first evaluation index concerning a variation in distance between a camera and a marker corresponding to the camera.

(7)

The information processing device according to any one of (3) to (6), in which the evaluation unit evaluates the calibration accuracy using a second evaluation index concerning a relationship between an optical path between a camera and a marker corresponding to the camera and an attitude of the camera or the marker.

(8)

The information processing device according to any one of (2) to (7), in which the location determination unit determines whether or not a predetermined calibration accuracy condition is satisfied in a case of locating the calibration camera in a candidate location evaluated as having the optimum calibration accuracy, and in a case where it is determined that the predetermined calibration accuracy condition is not satisfied, determines that an additional calibration camera is to be located in the imaging space.

(9)

The information processing device according to (8), in which the predetermined calibration accuracy condition is based on at least one of a first evaluation index concerning a variation in distance between a camera and a marker corresponding to the camera and a second evaluation index concerning a relationship between an optical path between a camera and a marker corresponding to the camera and an attitude of the camera or the marker.

(10)

The information processing device according to (8) or (9), in which in a case where it is determined that the additional calibration camera is to be located in the imaging space, the location determination unit causes the evaluation unit to evaluate the calibration accuracy obtained for the additional calibration camera on a basis of a location of a remaining imaging camera obtained by excluding an imaging camera that can be favorably calibrated by the calibration camera at an initial stage from the plurality of imaging cameras.

(11)

The information processing device according to any one of (8) to (10), in which the location determination unit repeats evaluation of the calibration accuracy and addition of the calibration camera until it is determined that the predetermined calibration accuracy condition is satisfied by locations of the calibration camera at an initial stage and the additional calibration camera more than or equal to zero.

(12)

The information processing device according to any one of (1) to (11), in which the information acquisition unit further acquires region information that defines a region in which the calibration camera can be located.

(13)

The information processing device according to (1), in which the information acquisition unit acquires further camera location information indicating a location of the calibration camera in the imaging space, the location being temporarily determined, and the information processing device further includes:

a user interface unit configured to feed back a result of evaluation of the calibration accuracy to a user, the evaluation being executed by the evaluation unit using the camera location information and the further camera location information.

(14)

The information processing device according to any one of (1) to (13), in which the locations of the imaging cameras include positions and attitudes of the imaging cameras, and the location of the calibration camera includes at least a position of the calibration camera.

(15)

A method executed by an information processing device, the method including:

acquiring camera location information indicating locations of a plurality of imaging cameras located in an imaging space; and evaluating calibration accuracy obtained in a case of locating a calibration camera in the imaging space on a basis of the location of each of the plurality of imaging cameras indicated by the camera location information and a location of the calibration camera.

(16)

A program for causing a processor of an information processing device to function as:

an information acquisition unit configured to acquire camera location information indicating locations of a plurality of imaging cameras located in an imaging space; and an evaluation unit configured to evaluate calibration accuracy obtained in a case of locating a calibration camera in the imaging space on a basis of the location of each of the plurality of imaging cameras indicated by the camera location information and a location of the calibration camera.

(17)

A multi-camera system including:

a plurality of imaging cameras located in an imaging space and configured to image the imaging space; and a calibration camera located in the imaging space and involved in calibration for locations of the plurality of imaging cameras, in which a location of the calibration camera is determined so as to optimize accuracy of the calibration assuming that the locations of the plurality of imaging cameras are given.

REFERENCE SIGNS LIST 1 multi-camera system
10, 12 imaging space
11, 13 field
20 imaging camera
41, 42 calibration camera
51 marker
100 calibration accuracy evaluation device (information processing device)
110 information acquisition unit
120 user interface unit
130 location determination unit
140 accuracy evaluation unit
150 storage unit

The invention claimed is:

1. An information processing device, comprising:
a Central Processing Unit (CPU) configured to:
acquire camera location information indicating a location of each of a plurality of imaging cameras located in an imaging space; and
evaluate calibration accuracy obtained in a case of locating a calibration camera in the imaging space based on the location of each of the plurality of imaging cameras indicated by the camera location information and a location of the calibration camera.

2. The information processing device according to claim 1, wherein the CPU is further configured to determine an optimum location of the calibration camera located in the imaging space based on the evaluated calibration accuracy.

3. The information processing device according to claim 2, wherein
in a case where one or more markers to be imaged for calibration of the imaging cameras are located in the imaging space, the CPU is further configured to evaluate the calibration accuracy based on the location of each of the plurality of imaging cameras, the location of the calibration camera, and a location of each of the one or more markers.

4. The information processing device according to claim 3, wherein the CPU is further configured to:
evaluate the calibration accuracy for each of a plurality of candidate locations within a region in which the calibration camera is capable of being located; and
determine the location of the calibration camera in accordance with a candidate location evaluated as having optimum calibration accuracy.

5. The information processing device according to claim 4, wherein the CPU is further configured to:
search for the optimum calibration accuracy using both of the location of the calibration camera and the location of each of the one or more markers as variable parameters; and
determine the location of the calibration camera and the location of each of the one or more markers through the search.

6. The information processing device according to claim 3, wherein the CPU is further configured to evaluate the calibration accuracy using a first evaluation index related to a variation in distance between a camera and a marker corresponding to the camera.

7. The information processing device according to claim 3, wherein the CPU is further configured to evaluate the calibration accuracy using a second evaluation index related to a relationship between an optical path between a camera and a marker corresponding to the camera and an attitude of the camera or the marker.

8. The information processing device according to claim 2, wherein
the CPU is further configured to determine whether a predetermined calibration accuracy condition is satisfied in a case of locating the calibration camera in a candidate location evaluated as having optimum calibration accuracy, and
in a case where it is determined that the predetermined calibration accuracy condition is not satisfied, the CPU is further configured to determine that an additional calibration camera is to be located in the imaging space.

9. The information processing device according to claim 8, wherein the predetermined calibration accuracy condition is based on at least one of a first evaluation index related to a variation in distance between a camera and a marker corresponding to the camera and a second evaluation index related to a relationship between an optical path between the camera and the marker corresponding to the camera and an attitude of the camera or the marker.

10. The information processing device according to claim 8, wherein in a case where it is determined that the additional calibration camera is to be located in the imaging space, the CPU is further configured to evaluate the calibration accuracy obtained for the additional calibration camera based on a location of a remaining imaging camera obtained by excluding an imaging camera that is favorably calibrated by the calibration camera at an initial stage from the plurality of imaging cameras.

11. The information processing device according to claim 8, wherein the CPU is further configured to repeat evaluation of the calibration accuracy and addition of the calibration camera until it is determined that the predetermined calibration accuracy condition is satisfied by locations of the calibration camera at an initial stage and the additional calibration camera more than or equal to zero.

12. The information processing device according to claim 1, wherein the CPU is further configured to acquire region information that defines a region in which the calibration camera is capable of being located.

13. The information processing device according to claim 1, wherein the CPU is further configured to:
acquire further camera location information indicating the location of the calibration camera in the imaging space, the location of the calibration camera being temporarily determined; and
feed back a result of evaluation of the calibration accuracy to a user, the evaluation being executed using the camera location information and the further camera location information.

14. The information processing device according to claim 1, wherein
the location of each of the plurality of imaging cameras includes a position and an attitude of the each of the plurality of imaging cameras, and
the location of the calibration camera includes at least a position of the calibration camera.

15. A method executed by an information processing device, the method comprising:
acquiring camera location information indicating a location of each of a plurality of imaging cameras located in an imaging space; and
evaluating calibration accuracy obtained in a case of locating a calibration camera in the imaging space based on the location of each of the plurality of imaging cameras indicated by the camera location information and a location of the calibration camera.

16. A non-transitory computer-readable medium having stored thereon computer-executable instructions that, when executed by a processor, cause the processor to execute operations, the operations comprising:
acquiring camera location information indicating a location of each of a plurality of imaging cameras located in an imaging space; and
evaluating calibration accuracy obtained in a case of locating a calibration camera in the imaging space based on the location of each of the plurality of imaging cameras indicated by the camera location information and a location of the calibration camera.

17. A multi-camera system, comprising:
a plurality of imaging cameras located in an imaging space and configured to image the imaging space; and
a calibration camera located in the imaging space and involved in calibration for locations of the plurality of imaging cameras, wherein
a location of the calibration camera is determined so as to optimize accuracy of the calibration in a case where the locations of the plurality of imaging cameras are given.

* * * * *